United States Patent [19]
Kane et al.

[11] Patent Number: 5,982,901
[45] Date of Patent: Nov. 9, 1999

[54] NOISE SUPPRESSING APPARATUS CAPABLE OF PREVENTING DETERIORATION IN HIGH FREQUENCY SIGNAL CHARACTERISTIC AFTER NOISE SUPPRESSION AND IN BALANCED SIGNAL TRANSMITTING SYSTEM

[75] Inventors: Joji Kane, Nara; Akira Nohara, Nishinomiya, both of Japan

[73] Assignee: Matsushita Electric Industrial Co., Ltd., Osaka, Japan

[21] Appl. No.: 08/257,109

[22] Filed: Jun. 8, 1994

[30] Foreign Application Priority Data

Jun. 8, 1993 [JP] Japan ................................. 5-137035
Jun. 8, 1993 [JP] Japan ................................. 5-137036

[51] Int. Cl.⁶ ............................................... H04H 5/00
[52] U.S. Cl. ........................... 381/13; 381/94.1; 348/614; 348/738; 455/296
[58] Field of Search ................................. 381/13, 71, 94, 381/92; 455/222, 223, 296, 278.1, 303, 305–306; 348/614, 533–535, 480–485, 738

[56] References Cited

U.S. PATENT DOCUMENTS

| | | |
|---|---|---|
| 3,803,357 | 4/1974 | Sacks . |
| 4,063,039 | 12/1977 | Endres et al. ............................. 381/13 |
| 4,153,815 | 5/1979 | Chaplin et al. ........................... 381/71 |
| 4,424,593 | 1/1984 | Kahn . |
| 4,577,226 | 3/1986 | Avins ....................................... 381/13 |
| 4,737,991 | 4/1988 | Sugai et al. .............................. 381/13 |
| 4,742,568 | 5/1988 | Furuya ................................. 455/278.1 |
| 4,783,818 | 11/1988 | Graupe et al. ........................... 381/83 |
| 4,977,615 | 12/1990 | Suzuki et al. ....................... 455/278.1 |
| 5,036,543 | 7/1991 | Ueno ....................................... 381/10 |
| 5,253,298 | 10/1993 | Parker et al. ............................ 381/13 |
| 5,253,299 | 10/1993 | Ishida et al. ............................ 381/13 |
| 5,267,310 | 11/1993 | Yoshiba ................................... 381/94 |
| 5,315,185 | 5/1994 | Usimaru . |
| 5,319,715 | 6/1994 | Nagami ................................... 381/71 |
| 5,337,365 | 8/1994 | Hamabe et al. ......................... 381/94 |
| 5,337,367 | 8/1994 | Mazda ..................................... 381/94 |
| 5,363,144 | 11/1994 | Park ...................................... 348/614 |
| 5,390,280 | 2/1995 | Kato et al. . |
| 5,390,344 | 2/1995 | Nagata ................................... 455/222 |
| 5,400,409 | 3/1995 | Linhard ................................... 381/94 |
| 5,414,386 | 5/1995 | Adachi et al. ........................... 381/94 |
| 5,590,206 | 12/1996 | An et al. ................................. 381/71 |

FOREIGN PATENT DOCUMENTS

| | | |
|---|---|---|
| 0 372 369 | 6/1990 | European Pat. Off. . |
| 0 418 036 | 3/1991 | European Pat. Off. . |
| 0 453 213 | 10/1991 | European Pat. Off. . |
| 0 558 312 | 9/1993 | European Pat. Off. . |
| 0 560 599 | 9/1993 | European Pat. Off. . |
| 2 400 287 | 3/1979 | France . |
| 39 39 478 | 8/1990 | Germany . |
| 56-48739 | 2/1981 | Japan ..................................... 381/13 |
| 57-026973 | 2/1982 | Japan . |
| 57-054436 | 3/1982 | Japan . |
| 59-017740 | 1/1984 | Japan . |
| 59-047857 | 3/1984 | Japan . |
| 60-203020 | 10/1985 | Japan . |
| 1023315 | 1/1989 | Japan . |
| 3222854 | 10/1991 | Japan . |
| 4246974 | 2/1992 | Japan . |
| 4137830 | 5/1992 | Japan . |
| 4262628 | 9/1992 | Japan . |
| 4282920 | 10/1992 | Japan . |
| 4308899 | 10/1992 | Japan . |
| 5134678 | 5/1993 | Japan . |
| 92-241064 | 9/1992 | U.S.S.R. . |
| 2 243 274 | 10/1991 | United Kingdom . |

*Primary Examiner*—Forester W. Isen
*Assistant Examiner*—Xu Mei
*Attorney, Agent, or Firm*—Ratner & Prestia

[57] ABSTRACT

A noise suppressor has signal detecting device 1 for detecting signals A and B on signal lines, sum signal generating device 21 for summing the detected signals, difference signal generating device 22 for differencing the detected signals, noise canceling device 3 for suppressing or removing noise components in a difference signal generated by the difference signal generating device and signal separating device 4 for separating the signal to those corresponding to the signal lines, according to the difference signal with the noise components suppressed or removed and the sum signals.

5 Claims, 29 Drawing Sheets

A: IF HIGH, SP LOW --> $\alpha$: LOW TO INTERMEDIATE
B: IF HIGH, SP HIGH --> $\alpha$: INTERMEDIATE
C: IF HIGH, SP LOW --> $\alpha$: LOW
D: IF LOW, SP HIGH --> $\alpha$: HIGH

NOISE SUPPRESSING APPARATUS CAPABLE OF PREVENTING DETERIORATION IN HIGH FREQUENCY SIGNAL CHARACTERISTIC AFTER NOISE SUPPRESSION AND IN BALANCED SIGNAL TRANSMITTING SYSTEM

DETAILED DESCRIPPTION OF THE INVENTION

1. Industrial Field of the Invention

The present invention relates to a noise suppressor for suppressing or removing noises contained in a stereo signal and other signals that are received and processed mainly by an FM receiver.

And the present invention relates to a noise suppressing apparatus for suppressing, or removing noise and the like contained in a signal processed by a signal processing apparatus such as a receiver and an amplifier, and processed by a recording/reproducing apparatus, e.g., a video deck, an audio deck, a CD player, a DAT deck, and so on.

2. Related Art of the Invention

Conventionally, in a transmission system for transmitting signals to plural signal lines, for example, a transmission system having two signals, R (right) and L (left), of a stereo, for suppression or removal of noise components in signals, a noise suppressor has been provided for R and L signals, respectively, to suppress or remove the noise components. As such noise suppressor, a noise limiter for simply limiting a noise level of a signal level or a higher level, a noise suppressor for dividing a signal to plural frequency bands, determining noise components in the signal, suppressing the noise components by providing a filter coefficient for cutting out the noise components to a bandpass filter (BPF) that is capable of controlling a bandpass characteristic for each of the frequency bands, and summing the frequency components thereafter and the like are used. These noise suppressors are also applied to a transmission system of balanced type in relation to noises.

However, it is a problem of such noise suppressing means that a sufficient noise suppressing effect cannot be obtained, when a noise component is low, because it is difficult to determine the noise component in a signal.

In consideration of such problem of conventional noise suppressor, it is an object of the invention to provide a noise suppressor capable of obtaining a sufficient noise suppressing effect.

Meanwhile on the other hand in general, when a signal is recorded on a magnetic tapes or reproduced from the recorded tape in a recording/reproducing apparatus such as a video deck and an audio deck, noise is produced in the recorded signal, or the reproduced signal due to various reasons. Since this noise may deteriorate the picture (image) quality of the reproduced video signal in the video deck, and the sound quality of the reproduced audio signal in the audio deck, such noise should be removed as much as possible.

Conventionally, various noise removing methods have been utilized by which noise components contained in signals are suppressed, or removed. In one conventional noise removing method, the level of the signal which has passed through the high-pass filters is limited by the noise limiter. Then, the signal which has passed through this noise limiter are recognized as the noise components and therefore the polarity of this signal is inverted. Finally, the polarity-inverted signal is superimposed with the original signal to cut off the noise component. In another conventional noise removing method, the signal is subdivided into a plurality of frequency bands, and a judgement is made whether or not noise components are contained in the subdivided signal. Based upon this judgement result, the filter coefficients capable of cutting such noise components are supplied to the band-pass filters (BPF) whose pass-band characteristics can be controlled, and which are provided for the respective frequency bands, thereby suppressing the noise components contained in the original signal. Thereafter, the respective frequency components are summed with each other.

However, since the high frequency characteristics of the signals which have been noise-suppressed in the above-explained noise suppressing method will be deteriorated, articulation cannot be improved. Moreover, there is another problem that noise would be newly produced during the noise suppression.

SUMMARY OF THE INVENTION

A noise suppressor for use in a signal transmission system of balanced type, of the present invention has:

signal detecting means for detecting signals on signal lines, sum signal generating means for summing signals detected by the signal detecting means, difference signal generating means for differencing the detected signals and difference signal canceling means for suppressing or removing the difference signal generated by the difference signal generating means A noise suppressor for use in a signal transmission system of balanced type in relation to noise components, of the present invention of claim 2 has:

signal detecting means for detecting signals on signal lines, sum signal generating means for summing signals detected by the signal detecting means, difference signal generating means for differencing the detected signals, noise canceling means for suppressing or removing noise components contained in the difference signal that is generated by the difference signal generating means and signal separating means for separating signals corresponding to the signal lines according to the difference signal with the noise components suppressed or removed and said sum signal.

A noise suppressor of the present invention is to change parameters according to a frequency band and multipass in noise suppression or removal using the spectral subtraction method.

A noise suppressor of the present invention has:

signal transmitting means for sending a signal to be transmitted and a phase-inverted signal thereof to a predetermined signal transmission system, respectively, signal mixing means for mixing the signal and inverted signal transmitted thereto by the signal transmission system and noise canceling means for suppressing or removing noises that enters the signal transmission system according to the mixed signal and the signal or inverted signal, wherein the noises are similarly contained in the signal and inverted signal in transmission.

A noise suppressor of the present invention has:

tuning control means for controlling the tuning of receiver means, detuning level detecting means for detecting a detuning level in the receiver means and noise canceling means for suppressing or removing noise components contained in a signal received by the receiver means according to the detected detuning level.

A noise suppressor of the present invention has:

ghost detecting means for detecting a ghost in a video signal of signals received by receiver means which is a TV receiver and noise canceling means for suppressing or removing noise components contained in an audio signal of the signals received by the TV receiver according to the detected ghost.

Meanwhile further the present invention has been made in an attempt to solve the above-described conventional problems, and therefore, has an object to provide a noise suppressing apparatus capable of preventing deterioration in high frequency characteristics of signals which have been noise-suppressed, thereby improving articulation of the reproduced signals.

Another object of the present invention is to provide a noise suppressing apparatus capable of reducing noise levels of reproduced signals which are produced during noise suppressing operation.

To achieve the above-described objects, a noise suppressing apparatus, according to the present inventions comprises: recording/reproducing means for recording/reproducing data; a noise memory for storing therein a noise pattern used to suppress, or remove a noise component of the data produced during the reproducing operation by the recording/reproducing means; and noise canceling means for suppressing, or removing the noise component contained in the reproduced signal of the recording/reproducing means based upon the stored noise pattern.

In the present invention, a recording/reproducing means performs the recording/reproducing operations of data; noise memory stores a noise pattern used to suppress, or remove a noise component; and a noise canceling means may suppress, or remove the noise component contained in the reproduced signal based upon the noise pattern stored in the noise memory.

In the present inventions there are provided: a recording/reproducing means performs the recording/reproducing operations of data; a noise acquiring means acquires noise data during the recording operation of the data; a noise memory stores the acquired noise data; and a noise canceling means suppresses, or removes the noise component contained in the reproduced signal based on the noise data stored in the noise data.

In the present inventions there are employed: a recording/reproducing means for recording/reproducing data; a no-signal-condition detecting means for detecting a no signal condition during signal reproducing operation; a noise memory for storing therein noise data under the no signal condition when the no signal condition is detected; and a noise canceling means for suppressing, or removing a noise component contained in the reproduced signal during the reproducing operation based on the noise data stored in the noise memory while at least no signal condition is not detected by the no-signal-condition detecting means during the reproducing operations In the present inventions there are provided an amplifying means for amplifying a signal; an amplification controlling means for controlling an amplification of the amplifying means; and noise canceling means for suppressing, or removing a noise component contained in the signal amplified by the amplifying means in response to the amplification.

In the present invention, there are provided: a signal switching means for switching an output signal derive from a receiving means for receiving a signal wave and an output signal derived from a recording/reproducing means for recording/reproducing a signal; and a noise suppressing signal processing means for suppressing, or removing a noise component contained in such a signal that the switched output signal corresponds to the signal derived from the receiving means, and for performing a signal control process operation when the switched output signal corresponds to the signal derived from the recording/reproducing means.

In the present invention, there are employed a sound collecting means for converting a sound into an electric signal; a wind information detecting means for detecting a physical amount related to wind during the sound collecting operation; noise generating means for generating a noise pattern corresponding to noise produced in correspondence to the physical amount related to the wind; and noise canceling means for suppressing or removing a noise component contained in the electric signal converted by the sound collecting means based upon the generated noise pattern.

In the present invention, there are provided: a switching operation judging means for performing a switching judgement on output signals from a first receiving means and a second receiving means in response to the reception signals from the first and second receiving means which receive signals at the same time; a switching means for switching the output signals derived from the first receiving means and the second receiving means in response to the switching judgement result; noise generating means for generating a noise pattern corresponding to noise produced during the switching operation based on the judgement result; and noise canceling means for suppressing or removing a noise component contained in the switched output signal based on the noise pattern generated by the noise pattern generating means.

In the present invention there are provided a signal processing means for processing a signal; a power source voltage detecting means for detecting a voltage of a power source of the signal processing means; a noise generating means for generating a noise pattern corresponding to noise produced with respect to the voltage of the power source in response to the detected voltage of the power source; and a noise canceling means for suppressing, or removing a noise component contained in the signal processed by the signal processing means based upon the generated noise pattern.

In the present invention, there are employed: a signal processing means for processing a signal; a noise-generation-information detecting means for detecting a physical amount related to a noise generation by a noise generating means; a noise generating means for generating a noise pattern corresponding to noise generated in accordance with the detected physical amount; and a noise canceling means for suppressing, or removing a noise component contained in the signal processed by the signal processing means based on the produced noise pattern.

In the present invent invention, there are provided: a signal processing means for processing a signal; a noise-generation-information detecting means for detecting a rotational frequency and/or a vibration frequency of a noise generating source; a noise generating means for generating a noise pattern corresponding to noise produced in response to the detected rotational frequency and/or the detected vibration frequency; and a noise canceling means for suppressing, or removing a noise component contained in the signal processed by the signal processing means.

In the present inventions there are employed: a signal processing means for processing a signal; a signal stop controlling means for stopping only the signal processed by the signal processing means; a noise memory for storing therein noise data of the signal processing means when the signal is stopped; and a noise canceling means for suppressing, or removing a noise component contained in the signal processed by the signal processing means based on the noise data stored in the noise memory.

In the present inventions there are provided: a signal processing means for processing a signal; a noise period detecting means for detecting a noise period during no signal time period of the signal processing means; a noise comparing means for comparing noise data present in the detected noise period with past noise data stored in a noise memory, and for updating the noise pattern of the noise memory by the noise data of the detected noise period under such a condition that a comparison result is greater than a predetermined value; and a noise canceling means for suppressing, or removing a noise component contained in such a signal based on the stored noise data that said signal corresponds to a signal from which at least the noise period is not detected.

In the present invention, there are provided: a signal processing means for processing a signal containing a sideband signal; a sideband signal detecting means for detecting the sideband component from the signal processed by the signal processing means; a sideband signal memory for storing the detected sideband signal; a noise detecting means for detecting noise from the signal; a noise memory for storing the detected noise; and a noise sideband signal canceling means for suppressing, or removing both the sideband component and the noise component contained in the signal processed by the signal processing means based on the sideband signal stored in the sideband memory and the noise stored in the noise memory.

PREFERRED EMBODIMENTS

Figure 1:
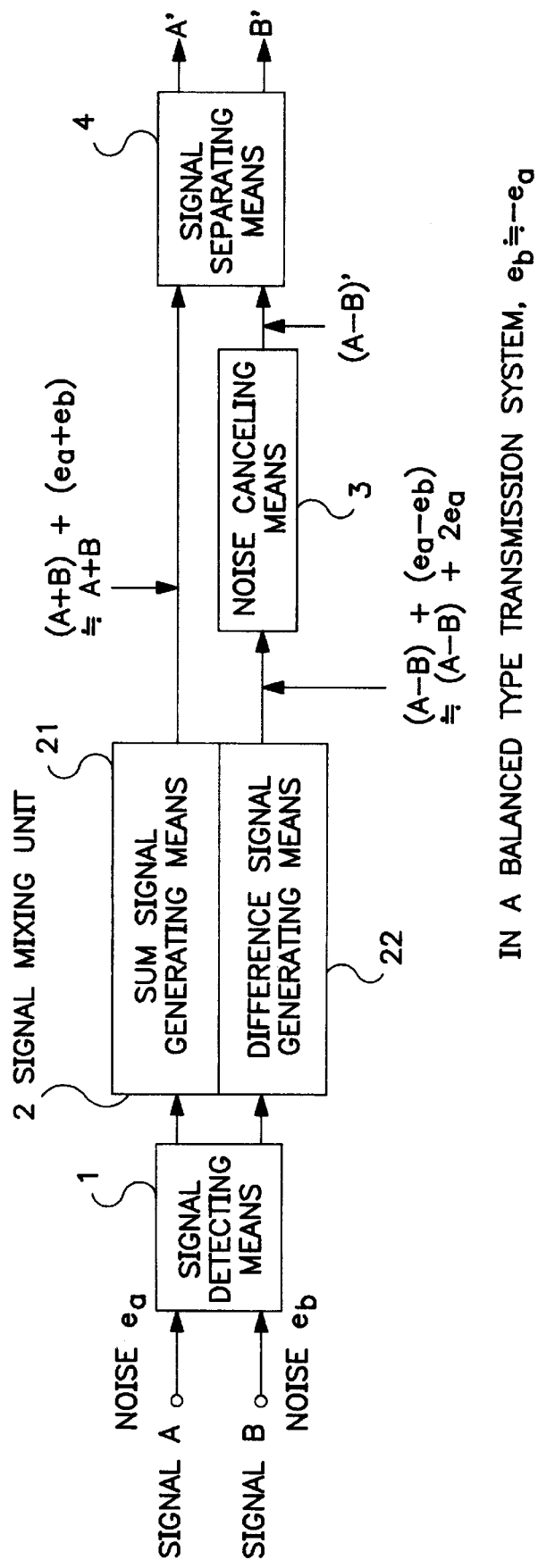
FIG. 1 is a block diagram of a noise suppressor according to a first embodiment of the invention.

By referring to the drawings, embodiments of the invention are described below.

FIG. 1 is a block diagram of noise suppressor according to a first embodiment of the invention. In detail, the noise suppressor comprises signal detecting means 1 for detecting signals, for example, signals A and B on plural (two, in this case) signal lines, and an output of the signal detecting means 1 is connected to a signal mixing unit 2 consisting of sum signal generating means 21 for generating a sum signal from the signals A and B and difference signal generating means 22 for similarly generating a difference signal. An output of the difference signal generating means 22 is connected to noise canceling means 3 for suppressing or removing noise components in the difference signal, and an output of the noise canceling means 3 and that of the sum signal generating means 21 are connected to signal separating means 4 for separating signals from the sum and difference signals (signal A' corresponding to signal A, and signal B' to signal B).

Now, operation of the noise suppressor of the embodiment is described.

Firstly, a signal transmission system shown in FIG. 1 is of a balanced type in relation to noises, and it is assumed that a signal A contains a noise ea, and the other signal B contains a noise eb. Then, signals detected by the signal detecting means 1 is expressed as signals (A+ea) and (B+eb).

Succeedingly, the signals are mixed by the signal mixing unit 2. In other words, a sum signal (A+B)+(ea+eb) is generated by the sum signal generating means 21 and a difference signal (A−B)+(ea−eb) by the difference signal generating means 22. However, in the case of a balanced type transmission system, because absolute values of the noises ea and eb are approximate, and phases thereof are inverse to each other, a noise component (ea+eb) of the sum signal approximates 0, and the noise can be removed. Therefore, an output signal from the sum signal generating means 21 is expressed as (A+B). On the other hand, since the noise component (ea−eb) of the difference signal is a noise of two times the level of ea or eb, and determination of the noise component is facilitated, the noise can be easily suppressed or removed.

Now, the difference signal (A−B)+(ea−eb) is regarded as a difference signal (A−B)+2ea, which is inputted to the noise canceling means 3. In the noise canceling means 3, the noise component 2ea is cancelled, and a difference signal (A−B)' is outputted (the signal is referred to by (A−B)' here, because the signal components are slightly changed, when the noise is cancelled).

The sum and difference signals with the noise components suppressed or removed is inputted to signal separating means, in which they are separated to signals A' and B' corresponding to the input signals, respectively.

Although the embodiment was described for suppression or removal of noises in a signal transmission system of balanced type in relation to noise components, it is not limited thereto, and can be arranged so as to suppress or remove a different signal of signals in a balanced type signal transmission system.

Figure 2:
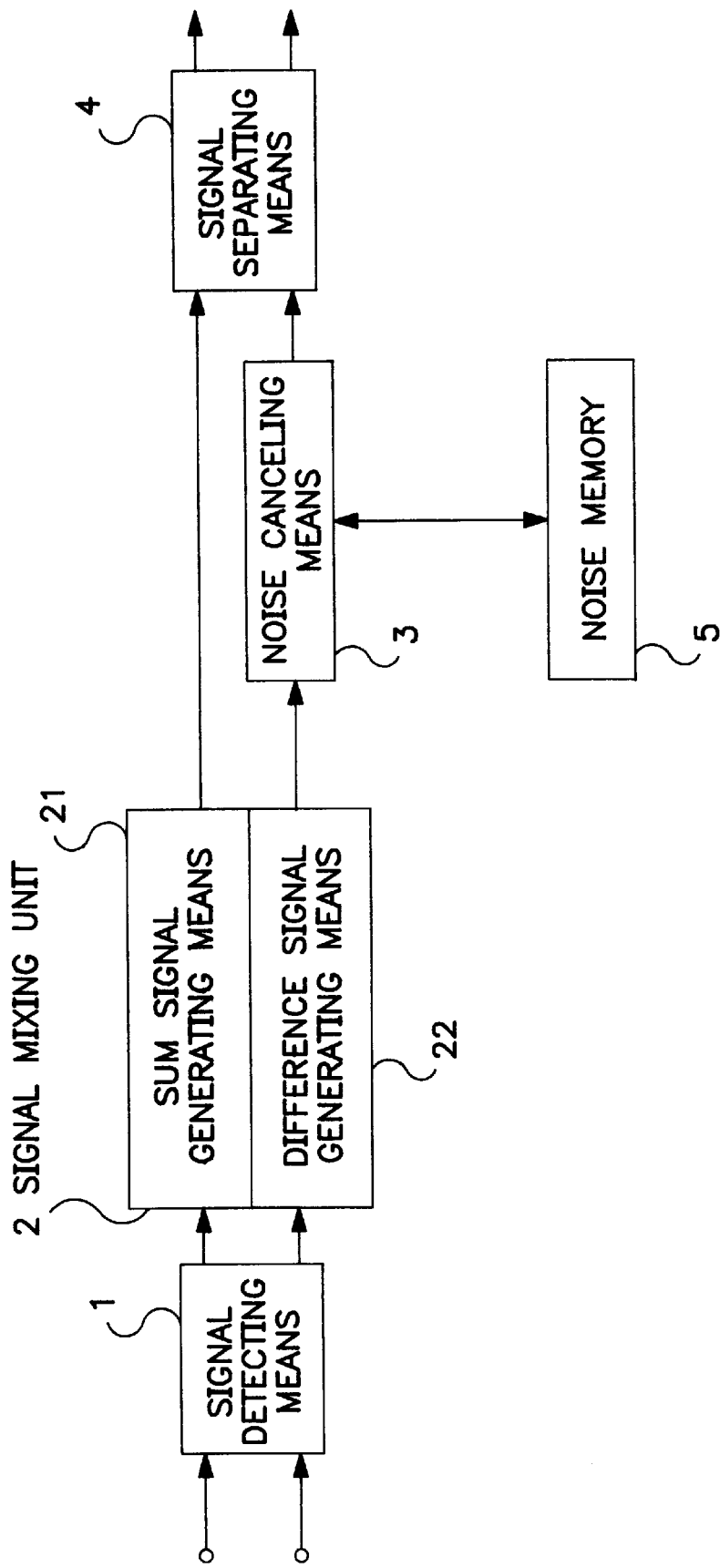
FIG. 2 is a block diagram of a noise suppressor according to a second embodiment of the invention.

FIG. 2 is a block diagram of noise suppressor according to a second embodiment of the invention. In the figure, the embodiment is different from the first embodiment in FIG. 1 only in that a noise memory 5 storing noise patterns is connected to noise canceling means 3, and other structures are identical to those of FIG. 1. Therefore, the noise canceling means 3 makes use of the noise patterns stored in the noise memory 5 for suppressing or removing noise components contained in a difference signal. Other principal functions are identical to those of the first embodiment.

Figure 3:
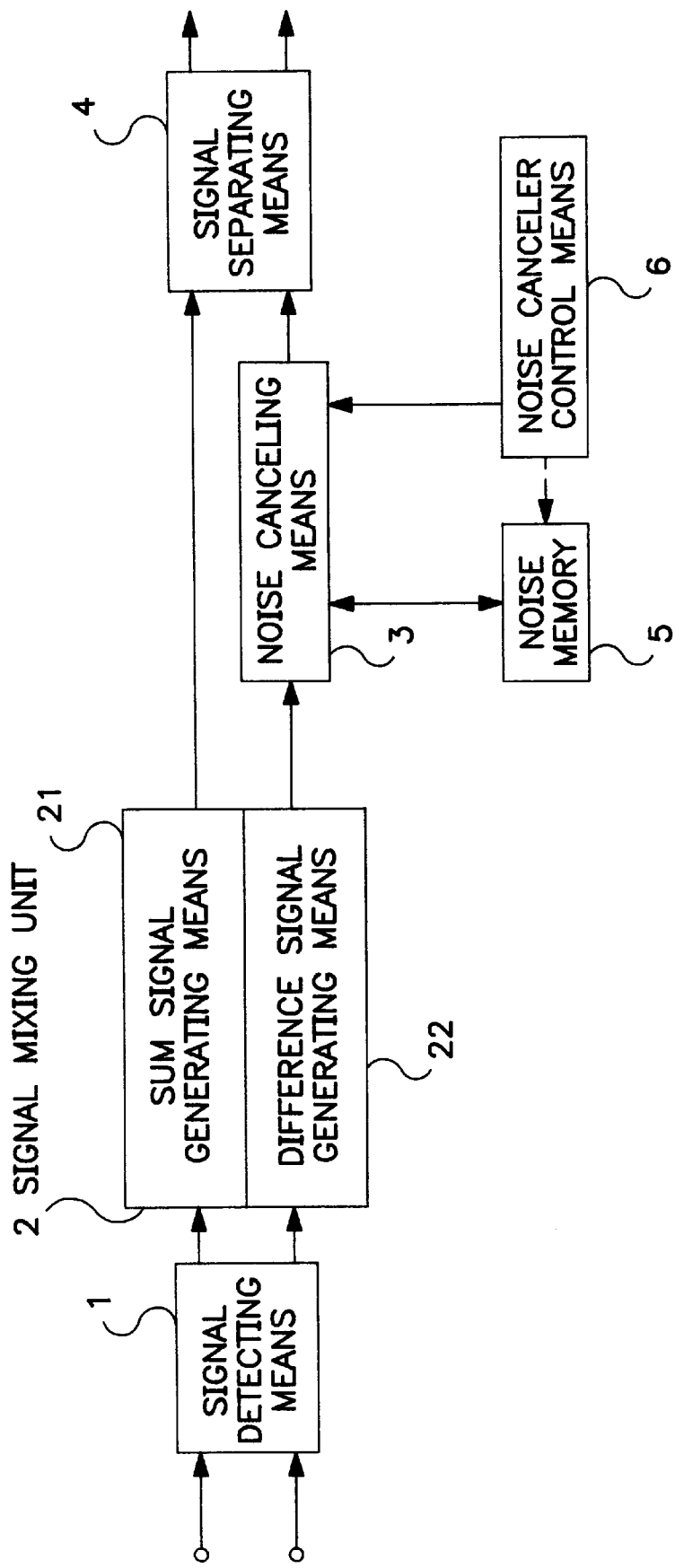
FIG. 3 is a block diagram of a noise suppressor according to a third embodiment of the invention.

FIG. 3 is a block diagram of noise suppressor according to a third embodiment of the invention. In the figure, the embodiment is different from the second embodiment shown in FIG. 2 only in that noise canceler control means 6 is connected to noise canceling means 3, and other structures are identical to those of FIGS. 20 The noise canceler control means 6 outputs a parameter that is used by the noise canceling means 3 for suppressing or removing noise components. Therefore, the noise canceling means 3 makes use of the noise patterns stored in the noise memory 5 and the parameter outputted from the noise canceler control means 6 for suppressing or removing noise components contained in a difference signal. In addition, a dotted line connecting the noise canceler control means 6 and noise memory 5 shows a modified embodiment that is arranged so as to update the noise patterns in the noise memory 5 according to the parameter outputted from the noise canceler control means 6. Principal functions are identical to those of the first embodiment.

Figure 4:
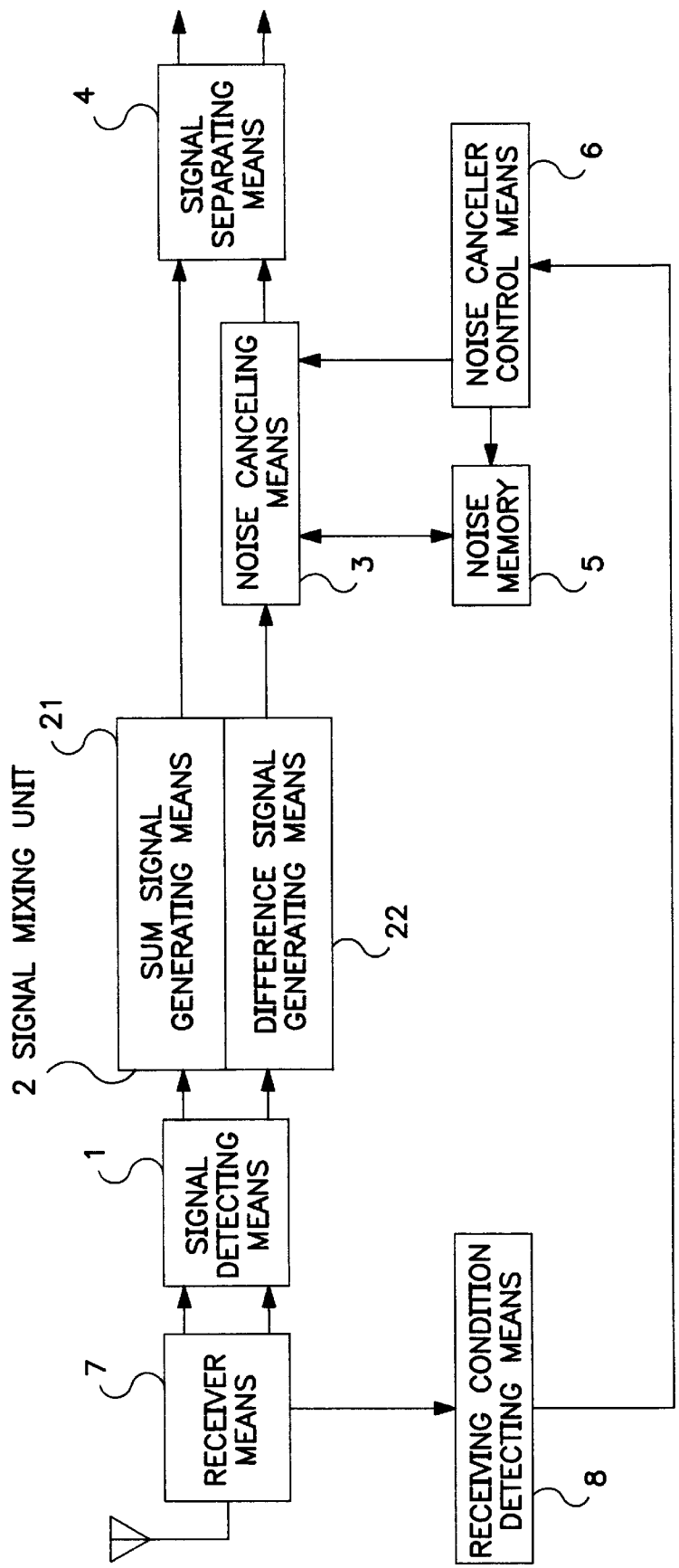
FIG. 4 is a block diagram of a noise suppressor according to a fourth embodiment of the invention.

FIG. 4 is a block diagram of noise suppressor according to a fourth embodiment of the invention. In the figure, the embodiment is different from the third embodiment shown in FIG. 3 in that receiver means 7 for receiving electric wave signal to obtain a signal that is inputted to signal detecting means, and receiving condition detecting means 8 for detecting a receiving condition of a signal received by the receiver means 7 are provided. An output of the receiving condition detecting means 8 is connected to an input of noise canceler control means 6. The noise canceler control means 6 outputs a parameter to noise canceling means 3 according to the receiving condition detected by the receiving condition detecting means 8, and updates noise patterns in noise memory 5. Here, the electric wave signal is, for example, a stereo broadcast wave signal, and the receiving condition is an input signal level, field strength of the received electric wave or the like.

Figure 5:
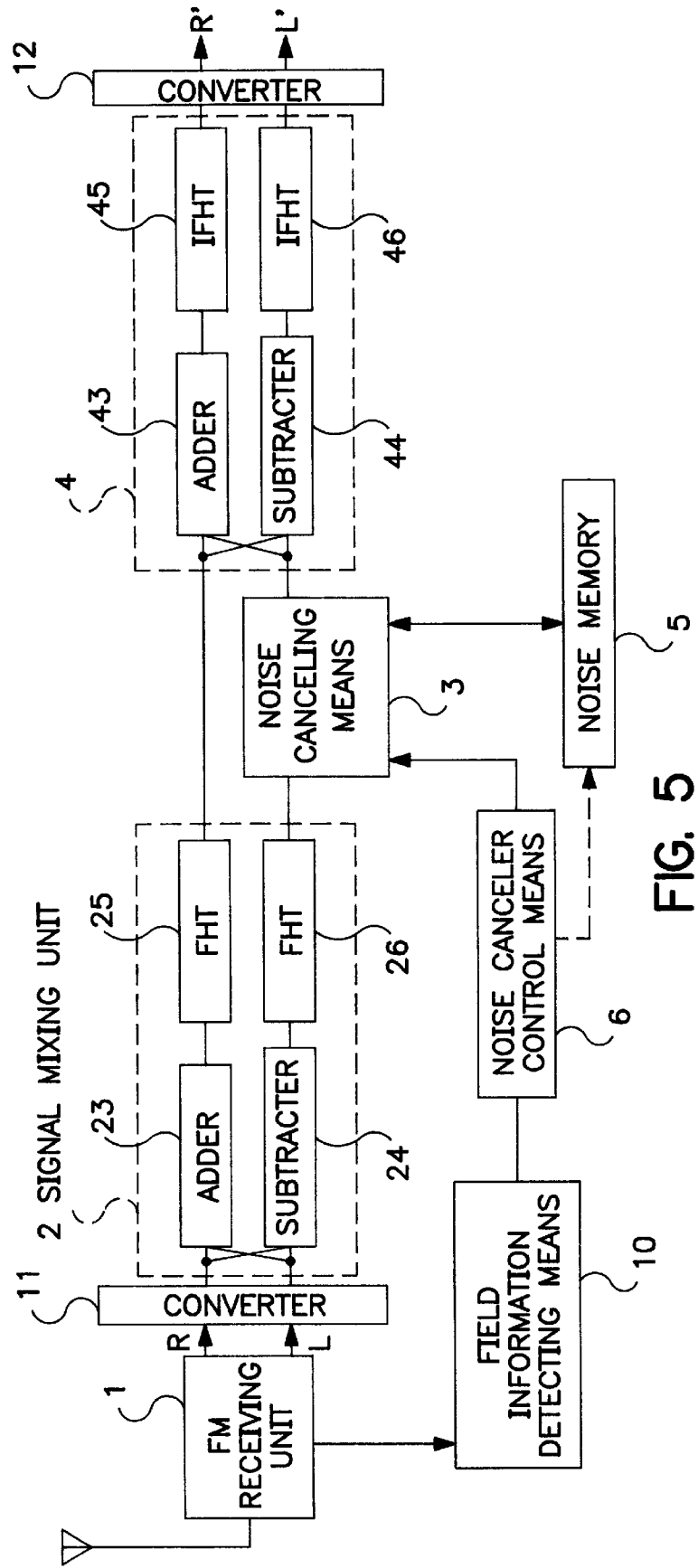
FIG. 5 is a block diagram of a noise suppressor according to a fifth embodiment of the invention.

FIG. 5 is a block diagram of noise suppressor according to a fifth embodiment of the invention. The noise suppressor of the embodiment is an application example to a receiver for FM stereo broadcast wave.

In FIG. 5, the noise suppressor is provided with an FM receiving unit 9 for receiving an FM stereo broadcast wave, and separating the stereo signal received to right and left channel signals (hereinafter referred to as R and L signals), the FM receiving unit 9 is connected with field information detecting means 10 for detecting field information of the received signals and the R and L signal outputs are supplied to an analog-to-digital converter 11 for converting an analog to a digital signal.

The analog-to-digital converter 11 is connected to a signal mixing unit 2 for generating sum and difference signals from the R and L signals, and the difference signal output is connected to noise canceling means 3 for suppressing or removing noise component in the difference signal. The signal mixing unit 2 includes sum signal generating means consisting of an adder 23 and a fast Hartley transducer (hereinafter referred to as FHT) 25 for generating the sum signal and difference signal generating means consisting of a subtracter 24 and FHT 26 for generating the difference signal.

An output (sum signal) of the signal mixing unit 2 and that (difference signal with noises cancelled) of the noise canceling means 3 are connected to signal separating means 4 for separating R' signal from L' signal that correspond to R and L signals according to the sum signal and difference signal with noises cancelled, and an output of the signal separating means 4 is connected to a digital-to-analog converter for converting a digital to an analog signal. The signal separating-means 4 includes a circuit consisting of an adder 43 and an inverted fast Hartley transducer (hereinafter referred to as IFHT) 45 for generating the R' signal and a circuit consisting of a subtracter 44 and IFHT 46 for generating the L' signal.

On the other hand, the field information detector 10 is connected to the noise canceler control means that outputs a parameter used for suppressing or removing noise components by the noise canceling means 3. Additionally, a noise memory 5 for storing noise patterns is connected to the noise canceling means 3. Here, as shown by a dotted line similarly to FIG. 4, the components may be arranged such that the noise patterns are updated by the parameter.

The FM receiving unit 9 provides receiver means, and the field information detecting means 10 forms receiving condition detecting means.

Now, a processing method of the noise canceling means 3 according to the fifth embodiment is illustratively described. Here, subtraction of the noise pattern is executed for each frequency component in each predetermined bandwidth.

Figure 17:
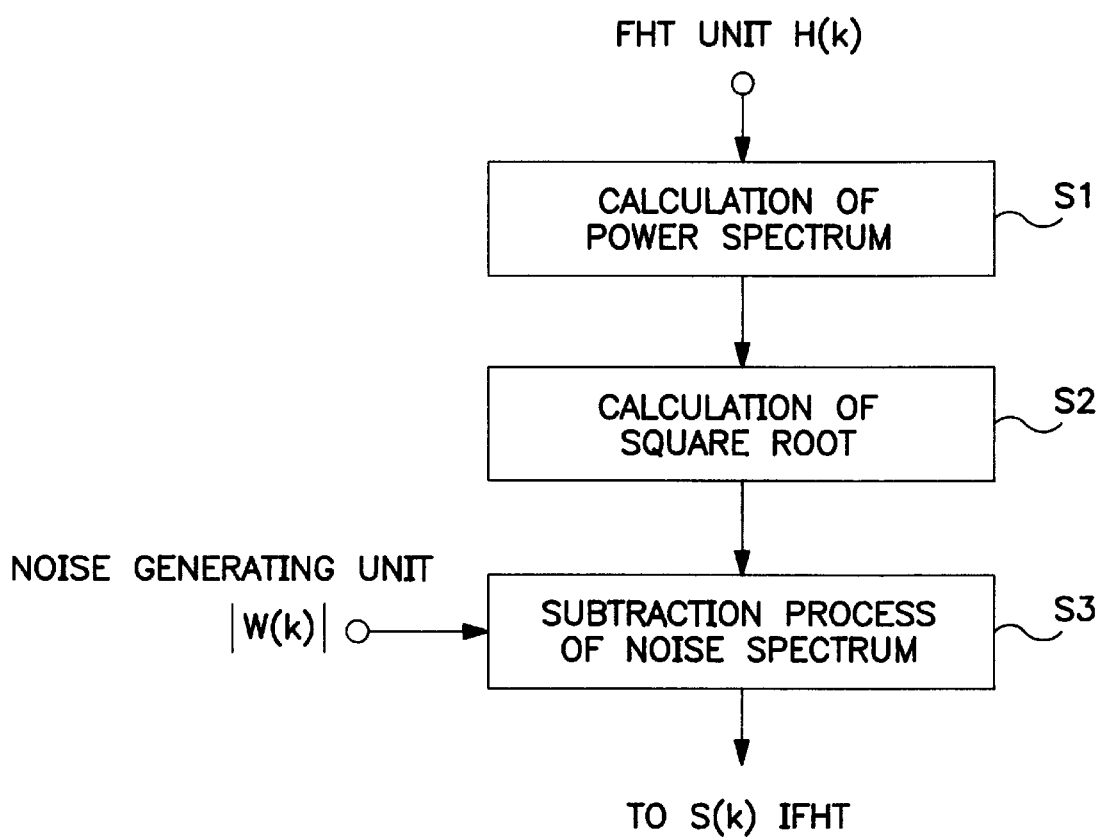
FIG. 17 is a flowchart showing an example of operation of the noise canceling means.

As shown in FIG. 17, firstly, a power spectrum $|X(k)|^2$ of an output H(k) that is subjected to a fast Hartley transduction by the FHT 26 is calculated by a formula (Formula 1) below (step S1).

Formula 1

$$|X(k)|^2 = (H^2(k) + H^2(N-k))/2$$

Succeedingly, by using a formula (Formula 2) below, a square root of the power spectrum obtained is calculated (step S2).

$$\sqrt{x} = -0.1985987x^2 + 0.8803385x + 0.3175231 \quad \text{Formula 2}$$

(accuracy of 10 bits)

Then, according to the value calculated and a noise pattern $|W(k)|$ outputted from a noise generating unit (noise memory 5 in FIG. 5), a noise spectrum is subtracted by using a formula (Formula 3) below (step S3).

Formula 3

$$S(k) = H(k) * (1 - \alpha |W(k)|/|X(k)|)$$

$$S(N-k) = H(N-k) * (1 - \alpha |W(k)|/|X(k)|)$$

However, correction should be performed to make $$(1 - \alpha |W(k)|/|X(k)|) \geq \beta$$

Setting of α and β

α: 0.5 (for an extremely weak field) 0.9 (for a strong field)

β: 0.2 to 0.6 where α is a canceling coefficient that determines a subtraction amount for subtraction of a noise patterns and β a clamping coefficient for controlling the canceling coefficient used in cancellation of a noise to minimize adverse effects of removing the noise.

In succession a principle of noise suppression of the fifth embodiment is described.

When right and left channel signals including noises are referred to as R' and L', those without noises as R and L, and the noises as $E_R$, $E_L$, respectively, Formula 4

$$R' = R + E_R$$

Formula 5

$$L' = L + E_L$$

At this point, (R+L') and (R'−L') are considered.

Formula 6

$$A = (R'+L')/2 = (R+L)/2 + (E_R+E_L)/2$$

Formula 7

$$B = (R'-L')/2 = (R-L)/2 + (E_R-E_L)/2$$

As a result of auditory experiment, it was confirmed that a noise level of signal A is extremely low, and that of signal B extremely high.

Therefore, when $E_R + E_L \approx 0$,

Formula 8

$$E_R \approx -E_L$$

And from (Formula 6), (Formula 7) and (Formula 8), the following formula is obtained:

Formula 9

$$A \approx (R+L)/2$$

Formula 10

$$B \approx (R-L)/2 - E_L \approx (R-L)/2 + E_R$$

Succeedingly, by suppressing noises in the state of (Formula 10), ($E_L'$, $E_R'$), A+B and A−B are obtained.

$$\begin{aligned}A + B &= (R+L)/2 + (R-L)/2 - E_L' \\ &= R - E_L' = R + E_R' \end{aligned} \quad \text{Formula 11}$$

$$\begin{aligned}A - B &= (R+L)/2 - ((R-L)/2 - E_L') \\ &= L + E_L' \end{aligned} \quad \text{Formula 12}$$

In (Formula 11) and (Formula 12), noises are reduced comparing with (Formula 4) and (Formula 5).

Now, the noise suppression is described in detail.

When signals and noises after the noise suppression are referred to by $R_S$, $L_S$, $E_{RS}$, $E_{LS}$, respectively in correspondence with the signals R, L and noises $E_R$, $E_L$, (Formula 7) is transformed into the following formula (Formula 13), after it is subjected to the noise suppression.

Formula 13

$$B' = (R_S - L_S)/2 + (E_{RS} - E_{LS})/2$$

Succeedingly, A+B' and A−B are obtained.

Formula 14

$$A + B' = (R+R_S)/2 + (L-L_S)/2 + (E_R + E_{RS} + E_L - E_{LS})/2$$

Formula 15

$$A - B' = (R-R_S)/2 + (L+L_S)/2 + (E_R - E_{RS} + E_L + E_{LS})/2$$

When $E_R = -E_L$;

$R_S = R - R_{SD}$ ($R_{SD}$: Error cancelled); and $L_S = L - L_{SD}$ ($L_{SD}$: Error cancelled), Formula 16

$$A+B'=R-R_{SD}/2+L_{SD}/2+(E_{RS}-R_{LS})/2=R+(L_{SD}-R_{SD})/2+(E_{RS}-E_{LS})/2$$

Formula 17

$$A-B'=L-(L_{SD}-R_{SD})/2-(E_{RS}-E_{LS})/2$$

Then, R and L channel signals are independently subjected to the noise suppression.

Formula 18

$$R_S' = R - R_{SD}' + E_{RS}'$$

Formula 19

$$L_S' = L - L_{SD}' + E_{LS}'$$

By comparing between (Formula 16), (Formula 18), (Formula 17) and (Formula 19), effects of the noise suppression are considered.

It is predicted that differences of suppression error ($L_{SD}-R_{SD}$)/2, $R_{SD}$, and $L_{SD}$, can be correlated as in a formula below.

Formula 20

$$|(L_{SD}-R_{SD})/2| < |R_{SD}'|, |L_{SD}'|$$

Formula 21

$$\because |L-R| < |L|, |R|$$

(Generally, the formula is true, if any in-phase component is present in L and R.)

It is appreciated that the left term is reduced than in the case of the clamping coefficient: $\beta = 50\%$ (Formula 21). Therefore, the effects of signal components are reduced.

Next, residual noise components of (Formula 16), (Formula 18), (Formula 17) and (Formula 19) are considered. Although it is predicted that ($E_{RS}-E_{LS}$)/2, $E_{RS'}$ and $E_{LS'}$ are correlated as:

Formula 22

$$(E_{RS}-E_{LS})/2 \approx E_{RS'}, E_{LS'}$$

because effects on signal components are reduced than in the case of (Formula 20), the noise suppression level can be set at a higher level.

Additionally, from (Formula 7), since the component of ($E_R - E_L$) is higher than $E_R$ and $E_L$, the noise component is more easily identified. Thus, when L and R are compared many components included in the noise have phases opposite to each other. For examples by comparing (Formula 6) with (Formula 7) the noise component can be identified. Generally, $|R+L| < |R-L|$ (when an antiphase component is absent).

In the case a lot of noises are included, it comes to be as:

Formula 23

$$|A| < |B|$$

Therefore, by obtaining L'-R', noises with antiphase components can be identified, the noise suppression can be effectively achieved, and effects of the noise suppression by L'-R' on the original signal is reduced.

Now, operation of the noise suppressor according to the fifth embodiment is described.

Firstly, a stereo signal received by the FM receiving unit 9 is separated to R and L signals, and outputted to the analog-to-digital converter 11. In the analog-to-digital converter 11, R and L signals are converted to a digital signal, respectively, and inputted to the signal mixing unit 2. Here, it is assumed that the R and L signals include noise components having an absolute value approximately equal and phases opposite to each other.

Then, the R and L signals are summed in the adder 23, the noise components are consequently offset by each other, and a sum signal (R+L) is produced. After that, the sum signal (R+L) is subjected to a fast Hartley transduction by the FHT 25 for easier processing of a noise pattern. On the other hand, subtraction between the R and L signals is executed in the subtracter 24, the noise components are approximately doubled as a result, and a difference signal (R-L) with two times the noise components is produced. Then, the difference signal (R-L) with two times the noise components is subjected to a fast Hartley transduction by the FHT 26. Here, H(k) that is an output of the FHT is calculated by using a formula (Formula 24) below.

$$H(k) = \sum_{n=0}^{N-1} \times (n) \cdot cas(2\pi k/N) \quad \text{Formula 24}$$

$$(k = 0, 1, \ldots, N-1)$$

$$cas(\theta) = \cos(\theta) + \sin(\theta)$$

Succeedingly, the sum signal (R+L) is inputted to the signal separating means 4, as the noise is already removed. On the other hand, the difference signal (R-L) with two times the noise components is inputted to the noise canceling means 3 to suppress or remove the noise components.

Meanwhile, the noise canceler control means 6 outputs a parameter to the noise canceling means 3 according to field information (it may simply be an input signal level) of a received signal detected by the field information detector 10. Moreover, a noise pattern corresponding to the field information is read from the noise memory 5 by the noise canceling means 3. The parameter serves for changing a subtraction rate according to the field information to minimize effects of the subtraction on the signal, and allow the noise components to be suppressed, in the case the noise pattern is subtracted from the noise components included in the difference signal, for example. Furthermore, assuming the parameter is a canceling coefficient $\alpha$ for a parameter multiplied by the noise pattern, and the field information an antenna input level, the value of canceling coefficient $\alpha$ is increased, when the antenna input level is relatively high, and the value of canceling coefficient $\alpha$ is reduced on the contrary, when the antenna input level is relatively low.

Figure 6A:
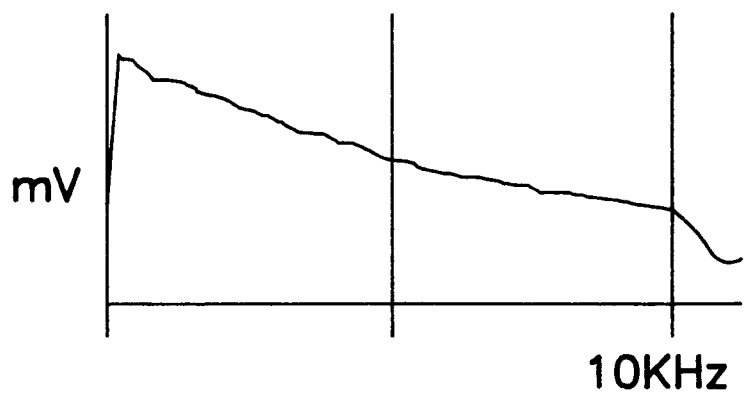
FIGS. 6(a), 6(b) and 6(c) are drawings showing noise patterns in relation to input signal levels.
Figure 6B:
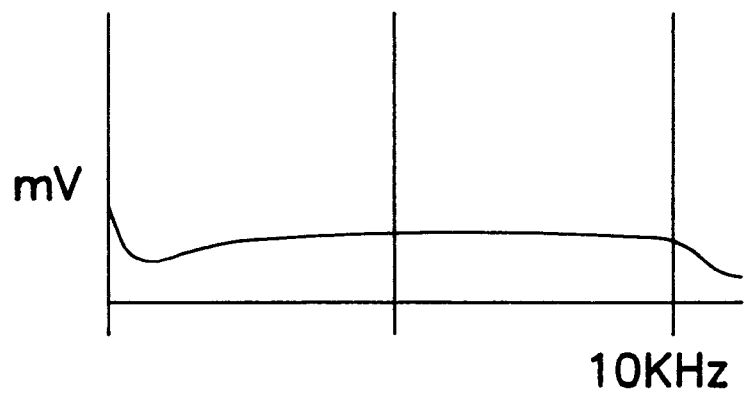
Figure 6C:
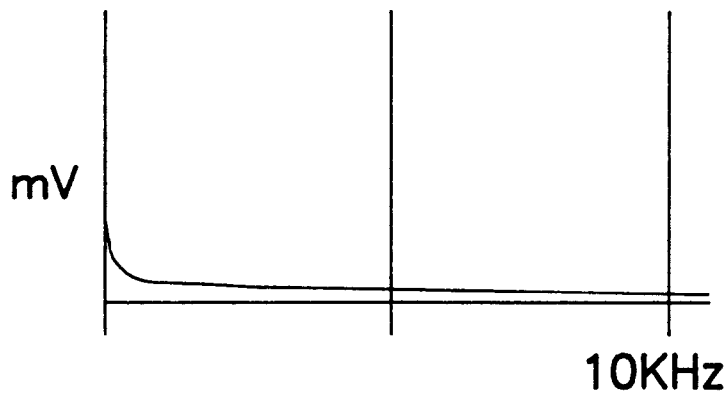

For example, by obtaining and storing in the noise memory 5 noise patterns corresponding to input signal levels as shown in FIGS. 6(a), (b) and (c), a noise pattern corresponding to an input signal level detected can be obtained from the noise patterns in the memory by means of interpolation or the like.

The difference signal (R-L)' (as the signal is somewhat transformed by the noise canceling means 3, it is now expressed as (R-L)') with noise components suppressed in such manner is inputted to the signal separating means 4. In the signal separating means 4, the sum signal (R+L) and difference signal (R−L)' are summed by the adder 43, and a resultant signal is, then, subjected to an inverted Hartley transduction by the IFHT 45, while subtraction between the sum signal (R+L) and difference signal (R−L)' is executed simultaneously by the subtracter 44, and a resultant signal is subjected, then, to an inverted Hartley transduction by the IFHT 46, as a result, an R' signal corresponding to the R signal is outputted from the IFHT 45, and an L' signal corresponding to the L signal from the IFHT 46. The R' and L' signals are converted to an analog signal, respectively by the digital-to-analog converter 12.

Although the fifth embodiment is arranged such that the fast Hartley transduction process is executed after the signal mixing in the signal mixing unit 2, it may be arranged so that the fast Hartley transduction process is executed, on the contrary, before the signal mixing.

In additions although the fifth embodiment is constructed so that the inverted fast Hartley transduction process is executed after the signal separation in the signal separating means 42, it may be such that the inverted fast Hartley transduction process is conducted before the signal separations contrarily.

Also, in the fifth embodiments although the noise canceling means 3 is provided only in the difference signal system, it is not limited thereto, and may be placed in the sum signal system as well.

Moreover, although the fifth embodiment utilizes input signal levels as the field information, and is arranged such that noise components in relation to the input signal levels are suppressed or removed, it is not limited thereto, and can be designed such that a multipass is used as the field information, and noise components caused by the multipass is suppressed or removed. In such case, noise patterns in relation to multipasses can be employed as the noise patterns.

Figure 15:
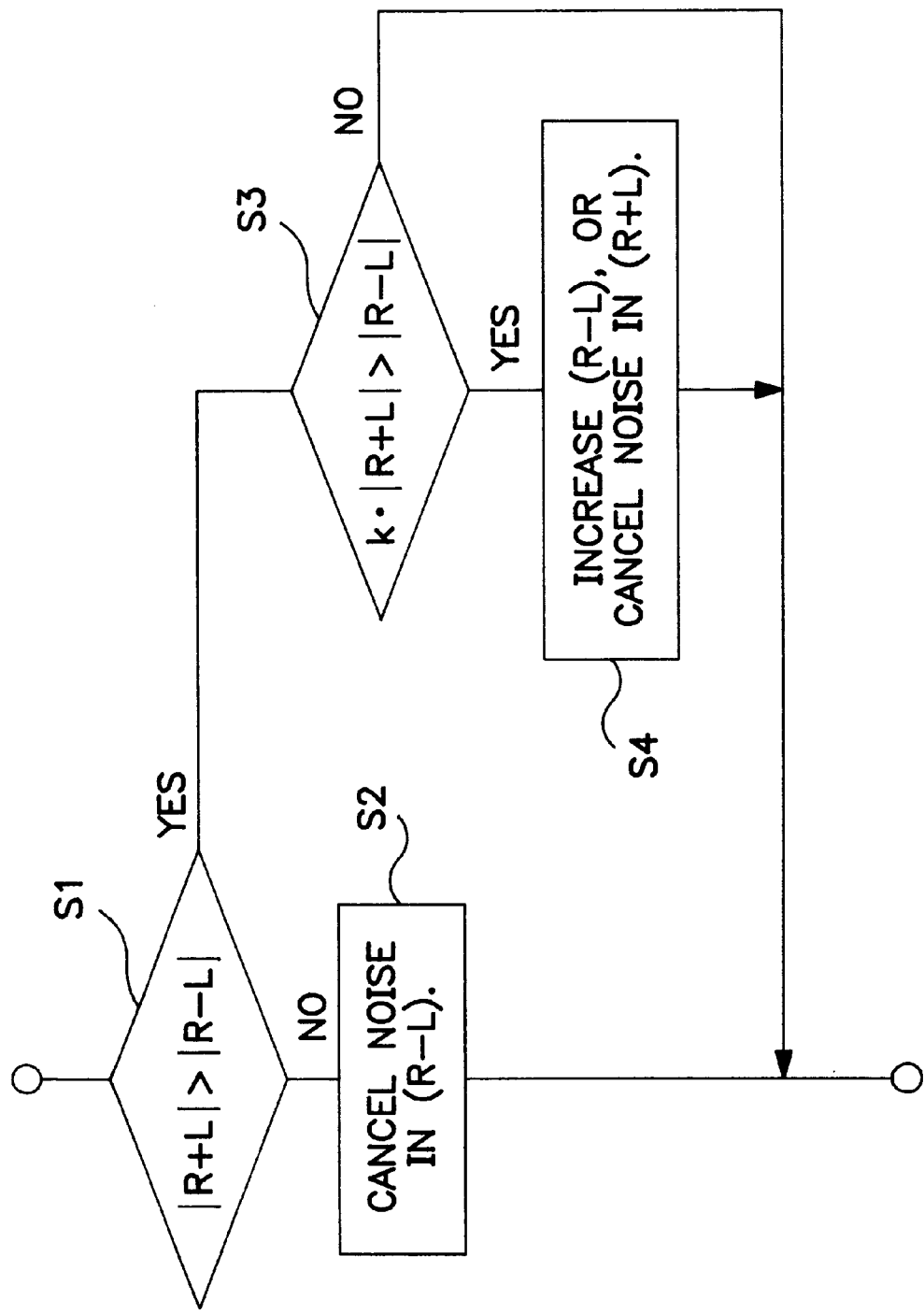
FIG. 15 is a flowchart showing an example of noise canceling process used by noise canceling means.

Furthermore, in the fifth embodiment, although the difference signal (R−L) is always subjected to the noise canceling, alternatively, as shown in FIGS. 15, for example, a value |R+L| of the sum signal (R+L) may be compared with a value |R−L| of the difference signal (R−L), and the difference signal (R−L) is subjected to the noise cancellation (step S2), consequently, when the value of difference signal (R−L) is higher than the other, while the sum signal (R+L) is multiplied by a predetermined constant, 0.5, for example, when the value of sum signal (R+L) is higher, and the value k×|R+L| is compared with that of |R−L| (step S3). As a result of the comparison, the difference signal (R−L) is increased, or the sum signal (R+L) is subjected to the noise cancellation (step S4), if the value k×|R+L| is higher, while the multiplied value is left as it is, if the value k×|R+L| is lower, on the contrary.

Figure 7:
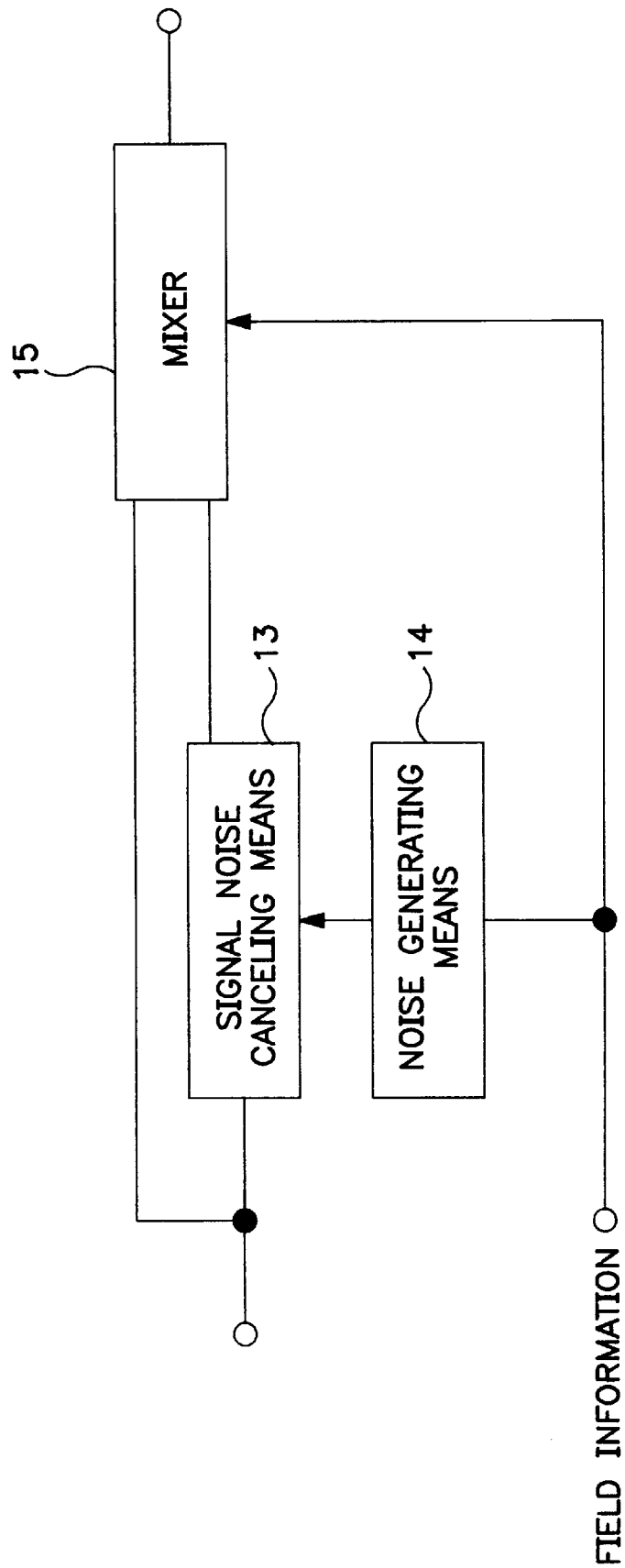
FIG. 7 is a block diagram of a noise suppressor according to a sixth embodiment of the invention.

FIG. 7 is a block diagram of noise suppressor according to a sixth embodiment of the invention. The noise suppressor of the embodiment is provided, for example, between the output of signal separating means 4 and input of digital-to-analog converter 12 of FIG. 5 for one or both signals.

In FIG. 7, the noise suppressor is provided with signal noise canceling means 13 for suppressing or removing noise components in a signal input from the signal separating means and a mixer 15 for mixing an output of the signal noise canceling means 13 and the signal input from the signal separating means. The signal noise canceling means 13 is connected to noise generating means 14 for generating a noise according to field information, and the mixer changes the mixing ratio between the two signals according to the field information.

Here, the field information is a multipass, and a noise component in the signal output from the signal separating means is suppressed by outputting a noise pattern from the noise generating means 14 to the signal noise canceling means 13 according to the multipass. The noise generating means 14 is, for examples a noise memory storing noise patterns in relation to multipasses. The mixer 15 mixes the signal from the signal separating means and a signal with its noise component suppressed at the mixing ratio according to the multipass. Regarding the mixing ratio, the ratio of noise-suppressed signal is increased in an area with a higher intensity of multipass, and the ratio of signal from the signal separating means is increased in an area with a lower intensity of multipass.

Figure 8:
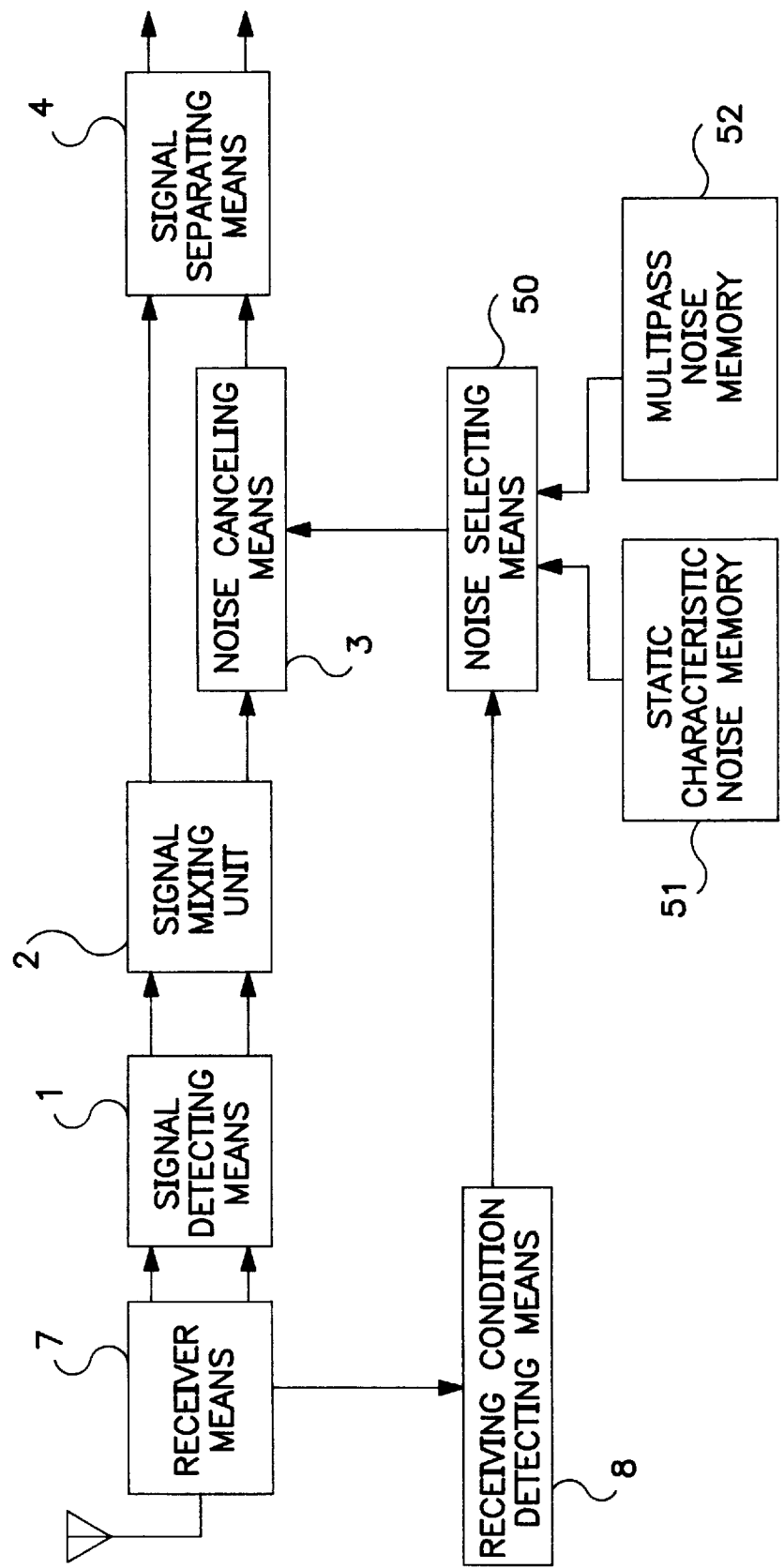
FIG. 8 is a block diagram of a noise suppressor according to a seventh embodiment of the invention.

FIG. 8 is a block diagram of noise suppressor according to a seventh embodiment of the invention. In the embodiment, a noise memory consists of a static characteristic noise memory 51 storing noise patterns of static noises and a multipass noise memory 52 storing patterns of noises caused by a multipass, and suppression of noise components by noise canceling means 3 is executed according to a receiving condition (antenna input level, in this case) detected by receiving condition detecting means 8 in such manner that the static characteristic noise memory 51 is selected by noise selecting means 50, if an antenna input level is low, while the multipass noise memory 52 is selected, if the antenna input level is high, and the noise patterns in the noise memory selected are utilized for the suppression. A reference of the antenna input level is approximately 30 dB$\mu$, for example, in the case of an FM receiver. Principal functions are similar to those described above.

Figure 9:
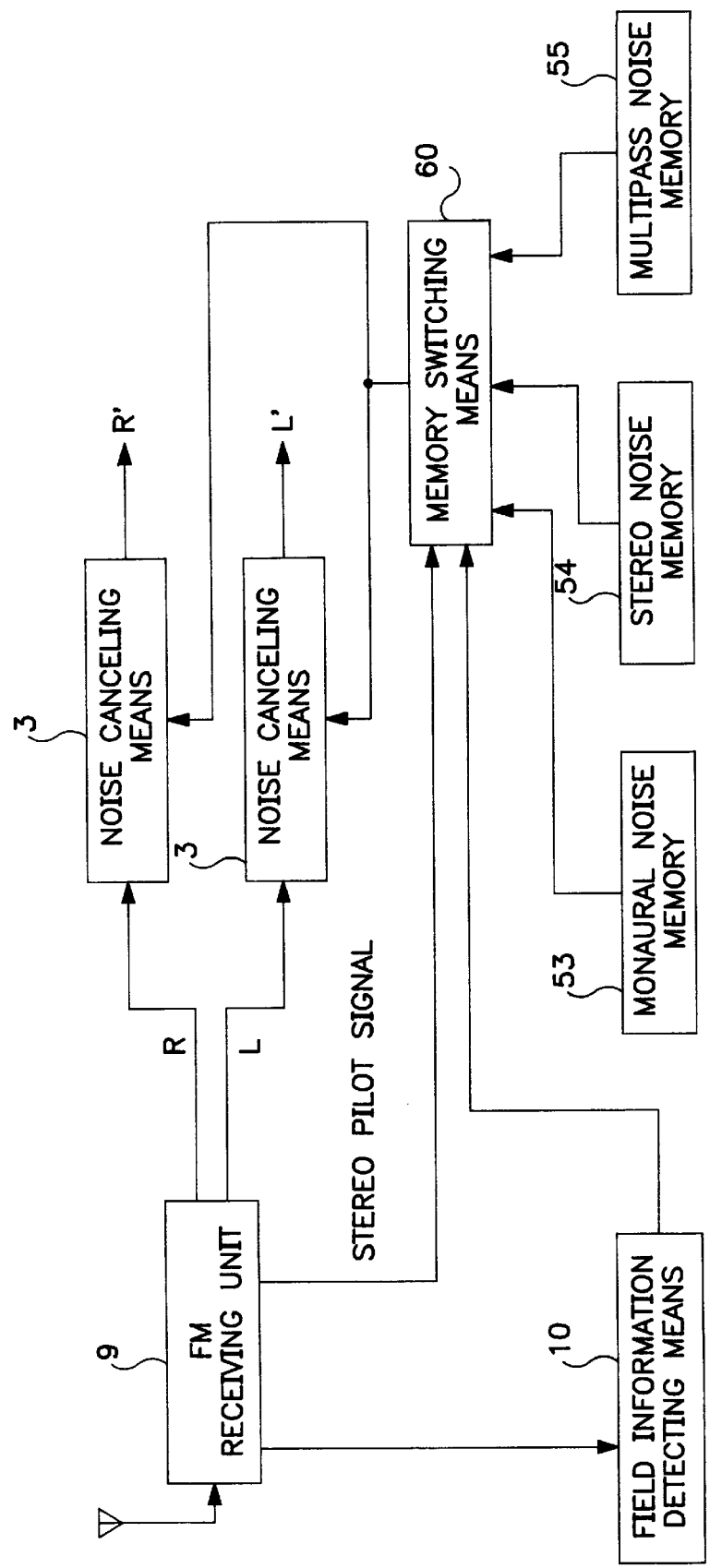
FIG. 9 is a block diagram of a noise suppressor according to a eighth embodiment of the invention.

FIG. 9 is a block diagram of noise suppressor according to an eighth embodiment of the invention. In the embodiment, a noise memory comprises a monaural noise memory 53 storing noise patterns of noise components contained in an (L+R) signal, a stereo noise memory 54 storing noise patterns of noise components in an (L−R) signal and a multipass noise memory 55 storing patterns of noises caused by a multipass. In additions noise canceling means 3 is provided in either systems for R and L signals outputted from a stereo demodulator (not shown) of an FM receiving unit 9. Suppression of noise components by the noise canceling means 3 is conducted by switching between the noise memories according to field information (antenna input level, in this embodiment) detected by a field information detector 10 to select an optimum noise pattern by memory switching means 60. The switching condition is such that the monaural noise memory 53 is selected, if a stereo pilot signal output from the stereo demodulator is absent (that is, resulting in a monaural signal), or the antenna input level is low, the stereo noise memory 54 is selected, if the stereo pilot signal output is present, and 19 kHz and 38 kHz signals are not included in the antenna input, and the multipass noise memory 55 is selected, if the stereo pilot signal output is present, and 19 kHz and 38 kHz signals are included in the antenna input.

Figure 10:
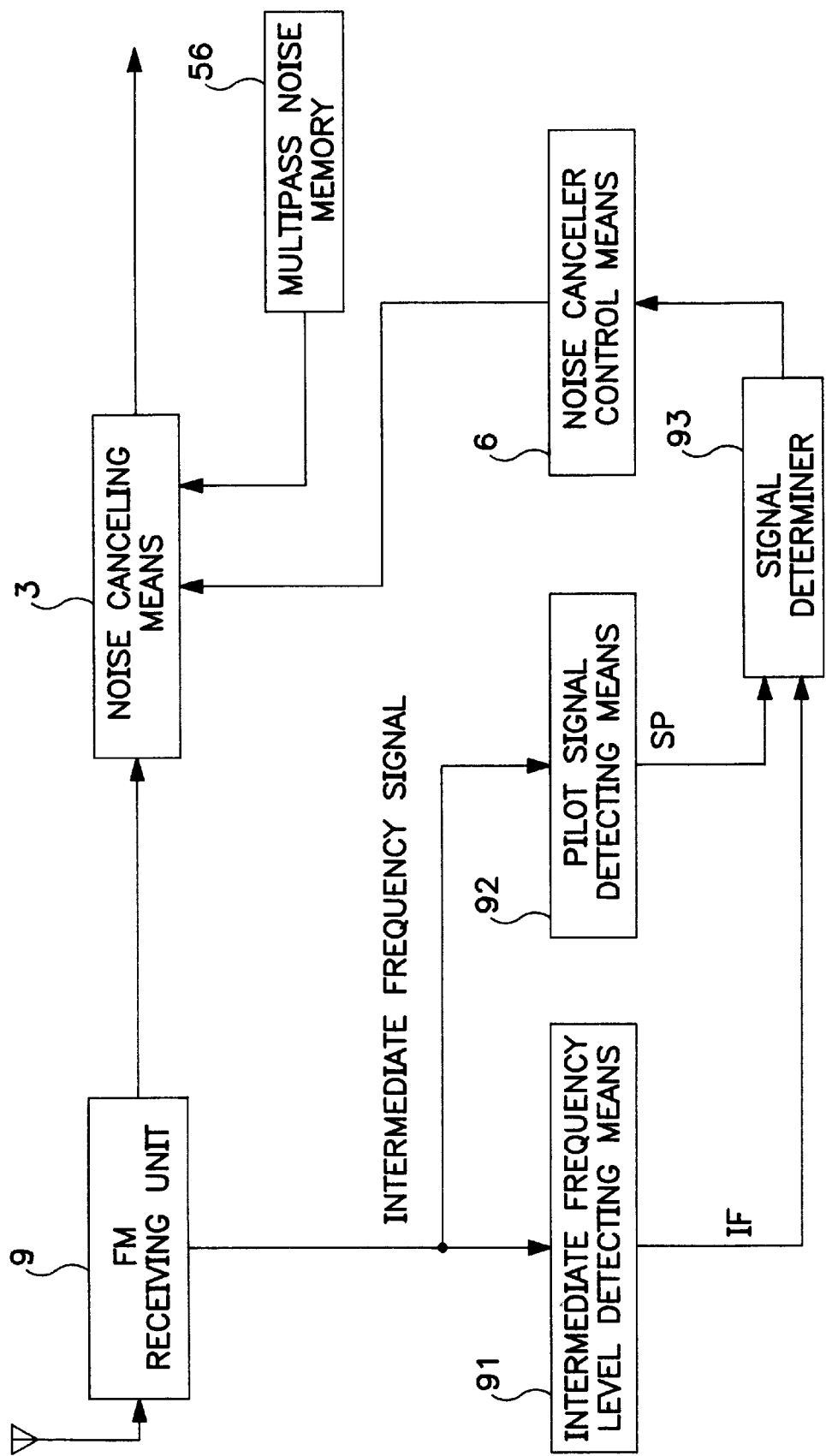
FIG. 10 is a block diagram of a noise suppressor according to a ninth embodiment of the invention.
Figure 11:
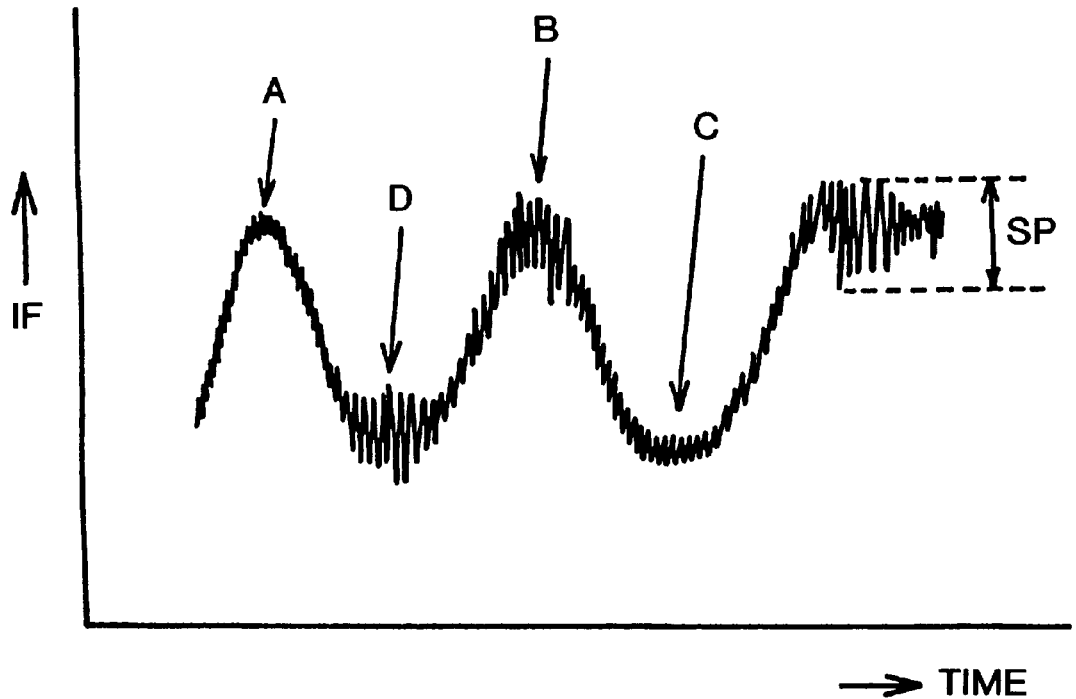
FIG. 11 is a drawing showing the operation of noise canceler control means 6 of the ninth embodiment.

FIG. 10 is a block diagram of noise suppressor according to a ninth embodiment of the invention. In the embodiment, a receiving condition (intermediate frequency signal level in this case) is detected from an intermediate frequency signal of an FM receiving unit 19 by intermediate frequency level detecting means 91, and a stereo pilot signal (19 kHz component and a double frequency component) from the intermediate frequency signal is detected by pilot signal detecting means 92. The level of intermediate frequency signal (IF) and the stereo pilot signal (SP) detected are determined for a signal condition by signal determiner 93, and inputted to noise canceler control means 6. The noise canceler control means 6 outputs a parameter to noise canceling means 3, according to a result of the determination. As shown in FIG. 11, the noise canceler control means 6 sets one of parameters, that is, a canceling coefficient α to low to intermediate, if the determination result of the signal determiner 93 indicates that the level of intermediate frequency signal (IF) is high, and the stereo pilot signal (SP) is low (FIG. 11-A), intermediate, if the IF level is highs and the SP signal is high (FIG. 11-B), low, if the IF level is low, and the SP signal is low (FIG. 11-C), and high, if the IF level is low, and the SP signal is high (FIG. 11-D).

Figure 12:
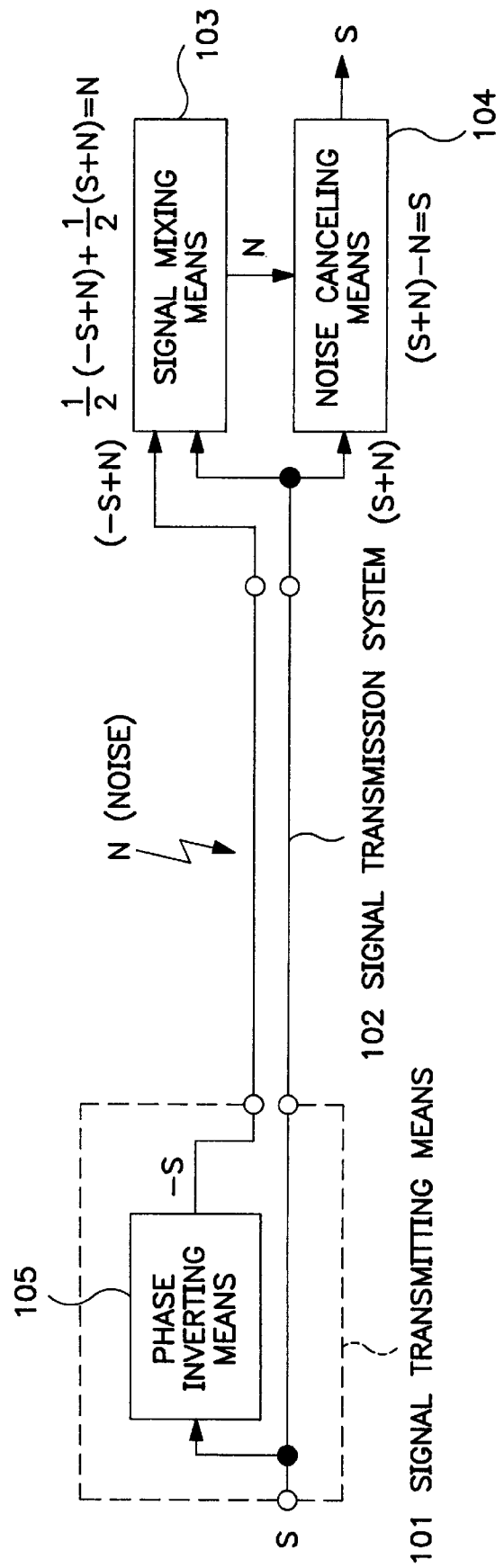
FIG. 12 is a block diagram of a noise suppressor according to a tenth embodiment of the invention.

FIG. 12 is a block diagram of noise suppressor according to a tenth embodiment of the invention. The embodiment is for removing noises that enter in a course of a signal transmission system, when a signal is transmitted through a signal transmission system for a relatively long distance. In FIG. 11, signal transmitting means 101 for transmitting a signal to a signal transmission system 102 is provided with phase inverting means 105 for inverting the phase of a signal, and a signal S and an inverted signal (−S) are transmitted.

When a noise N enters the signal S and inverted signal (−S) in a course of transmission through the signal transmission system 102, assuming that conditions of configuration and the like of transmission lines of the signal transmission system 102 are approximately identical, the signals transmitted come to be (S+N) and (−S+N).

The signals (S+N) and (−S+N) are summed to make ½. Then, the signal S and inverted signal (−S) are offset by each other, and only a noise N is outputted. In noise canceling means 104, subtraction between the signal (S+N) and noise N from noise mixing means 103 is executed, the noise N is removed, and only the signal S is outputted, as a result.

Incidentally, although the tenth embodiment is such that the noise canceling means 104 subtracts the noise N outputted by the noise mixing means from the signal (S+N), it may be alternatively arranged to subtract the signal (−S+N) from the noise N.

Figure 13:
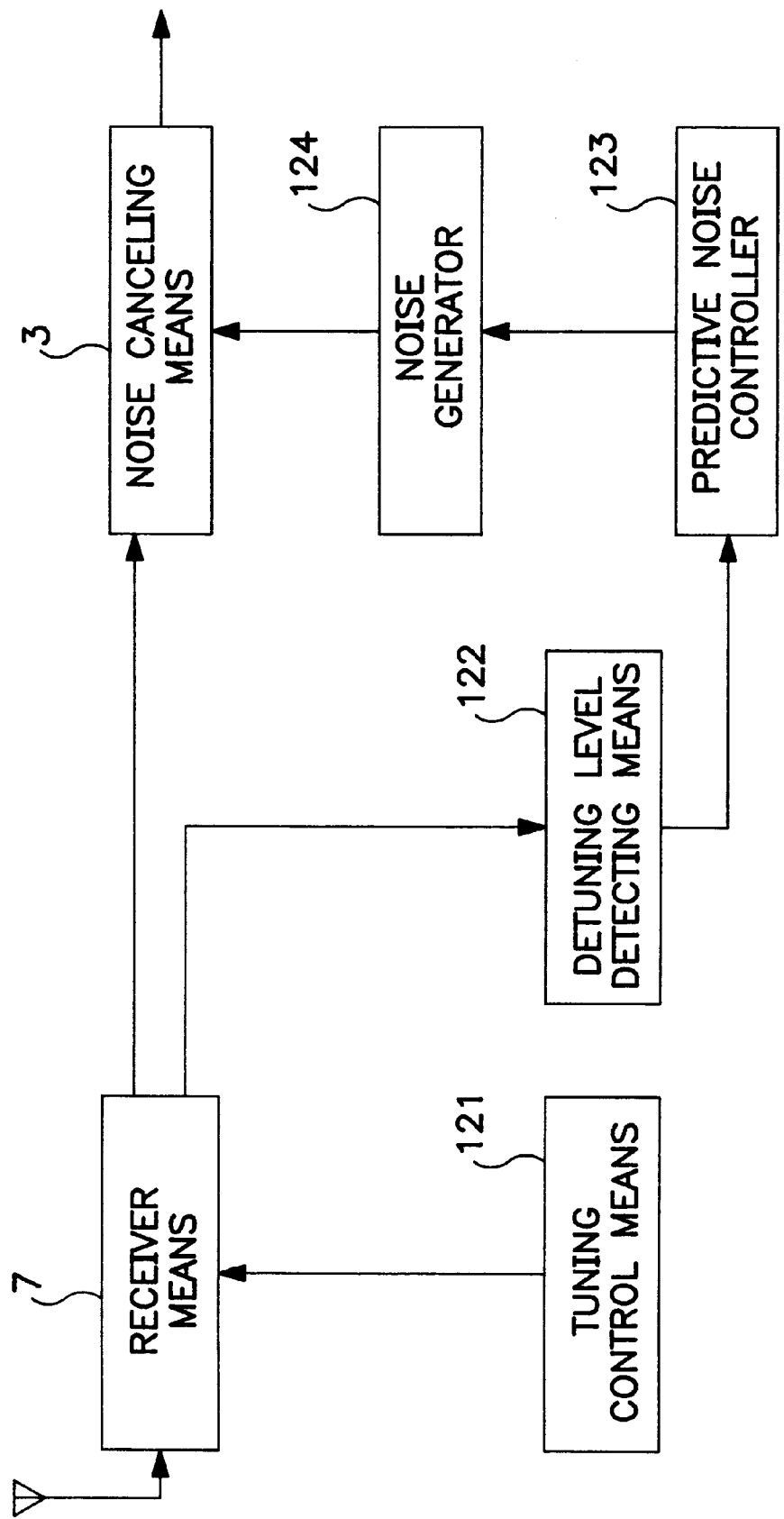
FIG. 13 is a block diagram of a noise suppressor according to a eleventh embodiment of the invention.

FIG. 13 is a block diagram of noise suppressor according to a eleventh embodiment of the invention. In the embodiment, tuning of receiver means 7 is automatically controlled by tuning control means 121, and a detuning level at that time is detected by detuning level detecting means 122. In predictive noise controller 123 and noise generator 124, a noise pattern corresponding to the detuning is generated, and outputted to noise canceling means 3, according to the detuning level detected. In response, the noise canceling means 3 suppresses noise components caused by the detuning. Thus, although the noise level is higher, when the detuning level is higher, the noises caused by the detuning can be suppressed. The detuning level may be also detected by using a tuning control signal of a synthesizer tuning control.

Figure 14:
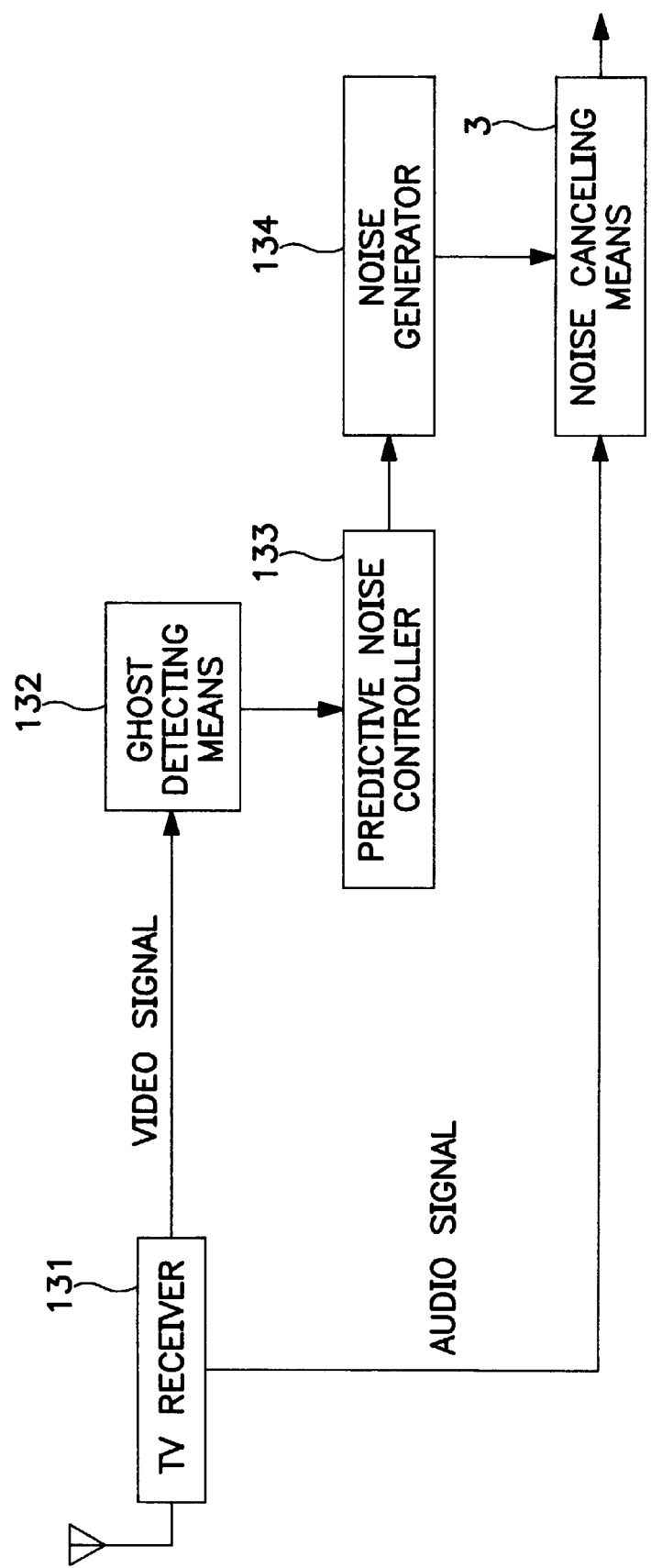
FIG. 14 is a block diagram of a noise suppressor according to a twelfth embodiment of the invention.

FIG. 14 is a block diagram of noise suppressor according to a twelfth embodiment of the invention. The embodiment shown is provided with a TV receiver 131 as receiving means. A ghost is detected in a video signal of the TV receiver 131 by ghost detecting means 132, and a noise pattern in relation to a multipass is developed by predictive noise controller 133 and noise generator 134, according to the ghost detected (a ghost in a TV set is caused by a multipass). Noise canceling means 3 is provided for audio signals of the TV receiver 131, and suppresses noise components in relation to a multipass contained in an audio signal, according to a noise pattern outputted by the noise generator 134.

Figure 16:
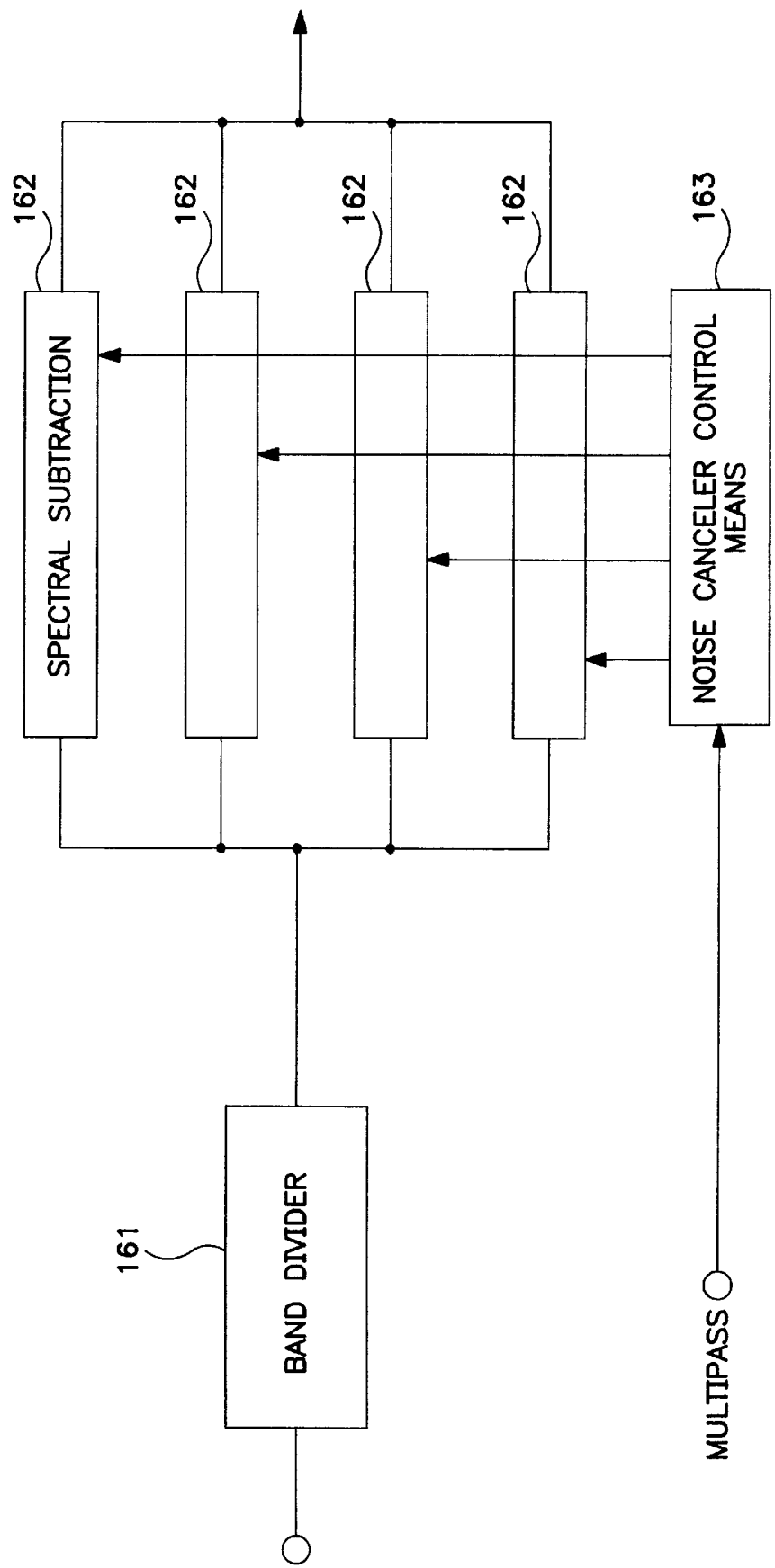
FIG. 16 is a drawing showing an example of structure of the noise canceling means.

FIG. 16 is a drawing illustrating a structure of the noise canceling means 3 used in the embodiment above that is designed for dividing a signal into bands, and suppressing or removing noises.

In FIG. 16, a signal containing noise components (a noise caused by a multipass, in this case) is divided into a plurality (four, in the example) of frequency bands, and the signals divided are inputted to a spectral subtraction 162 that is a type of noise canceling means provided for each of the frequency bands, respectively.

On the other hand, a multipass detected by means of multipass detecting means or the like is supplied to noise canceler control means 163, and the noise canceler control means 163 controls the spectral subtraction 162 so that noises caused by the multipass is suppressed. The control effects, for example, to a canceling coefficient α and clamping coefficient β of a parameter in the spectral subtraction 162. In addition, noise patterns in relation to multipasses stored in a noise memory, although not shown, is used for suppression of noises.

Incidentally, in the embodiment, although the spectral subtraction is taken as an example of the noise canceling means 3, it is not limited thereto, and an adaptive filter, bandpass filter, muting method and the like may be used, As clearly shown in the description above, because the invention comprises sum signal generating means for summing signals, difference signal generating means for differencing signals detected and noise canceling means for suppressing or removing noise components contained in the difference signal that is generated by the difference signal generating means, it is an advantage that a sufficient noise suppressing effect is obtained, even when the noise component is low.

In addition, since the invention comprises signal mixing means for mixing a signal and an inverted signal transmitted by a signal transmission system and noise canceling means for suppressing or removing noises entering in the signal transmission system, according to the mixed signal and the signal or inverted signal, it is an advantage that noises transmitted through the signal transmission system can be removed.

Further referring to other drawings, a description will be made of a noise suppressing apparatus according to preferred embodiments of another present invention.

Figure 18:
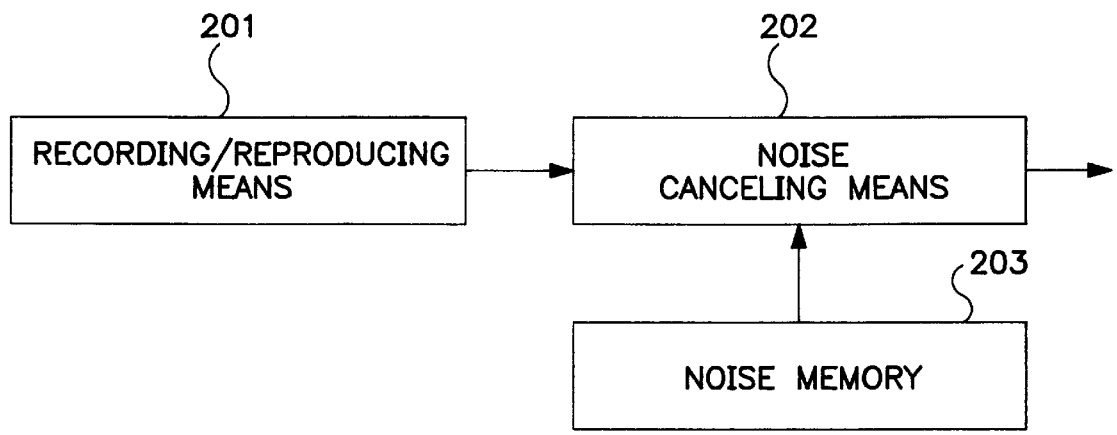
FIG. 18 is a schematic block diagram for showing an arrangement of a noise suppressing apparatus according to a first embodiment of the present invention.

FIG. 18 schematically shows an arrangement of a noise suppressing apparatus according to a first embodiment of the present invention. In this first noise suppressing apparatus a recording/reproducing means 1 for recording/reproducing either data, or a signal is provided and a noise canceling means 202 is connected to the output terminal of this recording/reproducing means 201. This noise canceling means 202 suppresses, or removes a noise component contained in a signal to be reproduced. To the noise canceling means 202, a noise memory 203 for storing therein a noise pattern suitable to suppress, or remove the noise component is connected.

As examples of the above-described recording/reproducing means 201, there are a video disk, a video movie, an analog audio deck, a CD (compact disk) player, a DAT (digital audio tape) deck, a semiconductor recorder, and the like. Also, for instance, an adaptive filter, a bandpass filter, muting, spectrum subtraction and so on may be applied as the noise canceling means 202. Further, it should be noted that various noise patterns such as noise and tape hiss noise specific to the respective devices employed in the recording/reproducing means 201 are graphically processed as the noise pattern.

Then, an operation of the noise suppressing apparatus according to the first embodiment of the present invention will now be explained.

First, it should be understood that the noise patterns most suitable to such noise that is produced from a recording medium, e.g., a magnetic tape on which a signal has been recorded, when the signal is reproduced by the recording/reproducing means 201, are previously stored into the noise memory 203. This noise corresponds to noise contained in the recorded signal, and noise produced from the recording/reproducing means 201 during the reproducing operation, or any one of these noise.

When the signal is reproduced by the recording/reproducing means 201, the noise component contained in this reproduced signal may be removed based upon the noise pattern previously stored in the noise memory 203 by the noise canceling means 202. The method for removing this noise component from the reproduced signal may be realized by, for example, subtracting the most suitable noise pattern from the reproduced signal.

Based upon the noise removing methods the noise canceling process can be performed by suppressing deterioration of the signal.

Figure 19:
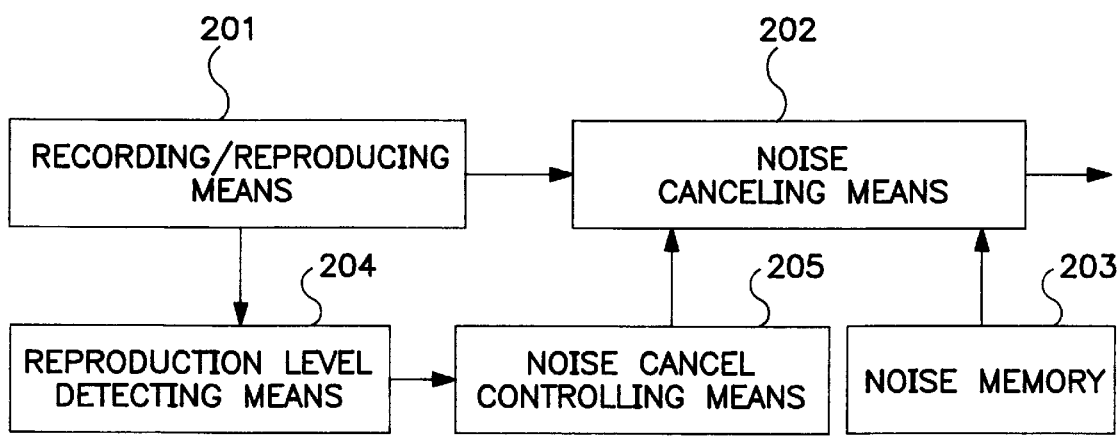
FIG. 19 is a schematic block diagram for indicating an arrangement of a noise suppressing apparatus according to a second embodiment of the present invention.

FIG. 19 schematically indicates an arrangement of a noise suppressing apparatus according to a second embodiment of the present invention. A different structural point from the first embodiment shown in FIG. 18 is such that a reproduction level detecting means 204 for detecting a level of a signal reproduced by the recording/reproducing means 201 is newly employed, and also a noise cancel controlling means 205 for outputting a parameter to the noise canceling means 202 in response to the detection result of this reproduction level detecting means 204, is newly employed. The remaining arrangements of the second noise suppressing apparatus are similar to those of the first noise suppressing apparatus shown in FIG. 18. In the noise canceling means 202, when the noise component contained in the signal is suppressed, or removed, both the noise pattern stored in the noise memory 203 and the parameter outputted from the noise cancel controlling means 205 are utilized.

Next, a description will now be made that the noise component processing method of the noise canceling method effected according to the second embodiment is carried out as a spectrum subtracting method. It should be noted that the subtraction process of the noise pattern is performed for each frequency component having predetermined frequency band. Although now shown in detail in this FIG. 2 the following signal process operation is executed in order to easily perform the noise canceling process in this spectrum subtraction method. That is, the reproduced signal is converted by an A/D converter into the corresponding digital signal, and this digital signal is further converted by a fast hartley transformer (FHT) to obtain a fast-hartley-transformed signal. After the noise cancellation, this fast-hartley-transformed signal is processed by an inverse fast hartley transformer (IFHT), and thereafter, the resultant transformed signal is converted by a D/A converter into an analog signal.

After the reproduced signal has been converted into the corresponding digital signal, this digital signal is processed by the fast hartley transformer (FHT) (formula 25).

$$H(k) = \sum_{n=0}^{N-1} x(n) \cdot cas(2\pi k/N)$$ Formula 25

$(k = 0, 1, \ldots, N-1)$ $cas(\theta) = \cos(\theta) + \sin(\theta)$

Then as described above by using FIG. 17, Power spectrum $|X(k)|^2$ of this fast-hartley-transformed output H(k) is calculated.

Succeedingly, as described above by using above mentioned formula (Formula 1), a square root of the power spectrum obtained is calculated.

Then, as described above according to the value calculated and a noise pattern $|W(k)|$ outputted from noise memory 203, a noise spectrum is substracted by using the above mentioned formula (Formula 3).

To be converted into the analog signal, the subtraction result S(k) is sent to the inverse fast hartley transformer (IFHT) so as to perform the inverse fast hartley transformation.

The cancel coefficient and clamp coefficient correspond to the above-described parameter. It may be arranged to control both of these coefficients, otherwise to control any one of them.

Figure 20:
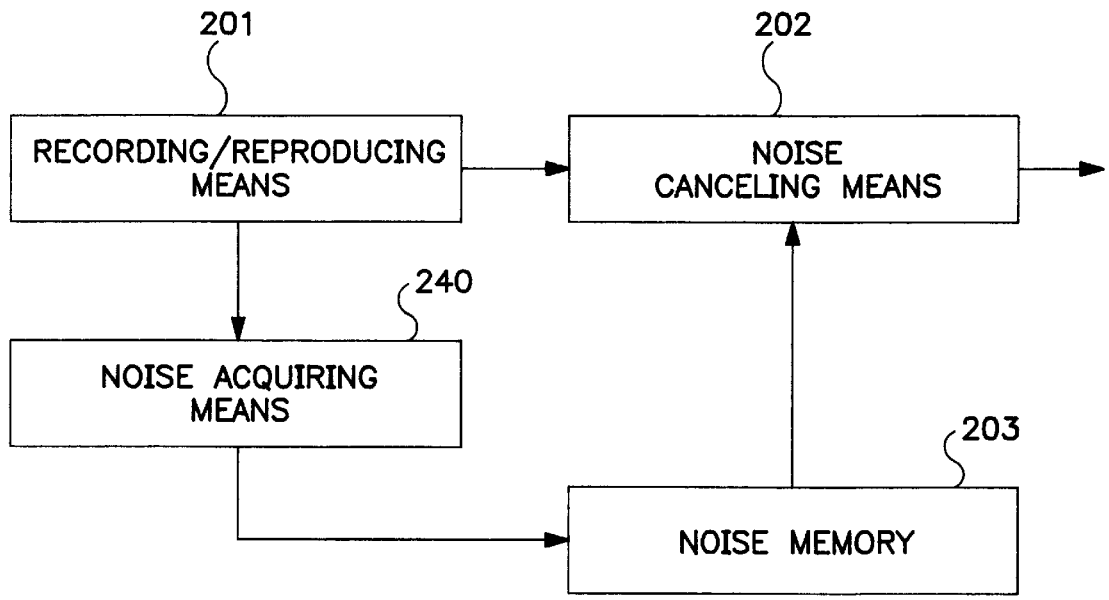
FIG. 20 is a schematic block diagram for representing an arrangement of a noise suppressing apparatus according to a third embodiment of the present invention.

FIG. 20 is a schematic block diagram for showing an arrangement of a noise suppressing apparatus according to a third embodiment of the present invention. In the noise suppressing apparatus according to this third embodiment, there is provided a noise acquiring apparatus 240 for acquiring a noise component produced during the signal reproducing operation by the recording/reproducing means 201, and the acquired noise data are stored in the noise memory 203. On the other hand, a noise component contained in the reproduced signal is suppressed, or removed based upon the noise data stored in the noise memory 203 during the signal reproducing operation by the recording/reproducing means 201. With the above-described circuit arrangement, the noise components mixed into the recording signal can be suppressed, or removed during the recording operation under optimum conditions.

Figure 21:
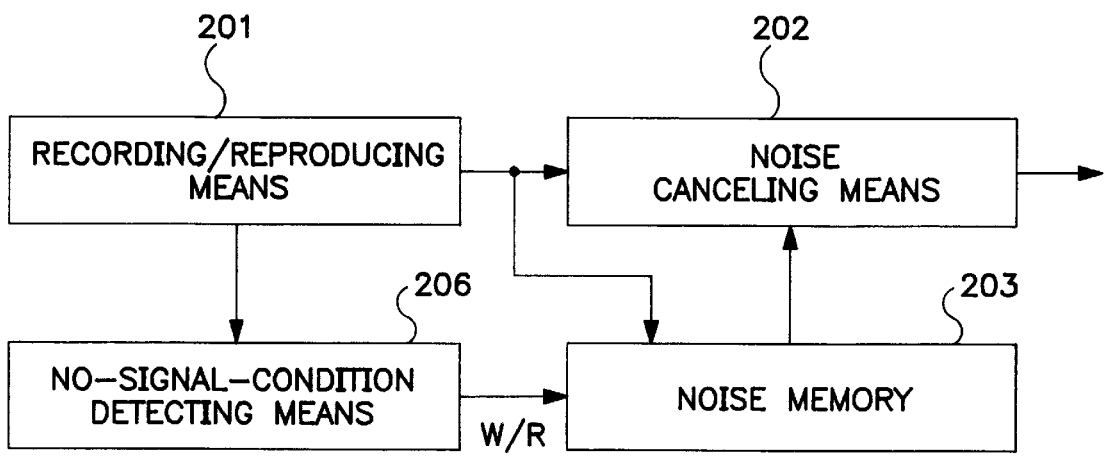
FIG. 21 is a schematic block diagram for denoting an arrangement of a noise suppressing apparatus according to a fourth embodiment of the present invention.

FIG. 21 is a schematic block diagram for representing an arrangement of a noise suppressing apparatus according to a fourth embodiment of the present invention. In the fourth noise suppressing apparatus, a no-signal-condition detecting means 206 is employed so as to detect whether or not no signal condition occurs when the signal is reproduced by the recording/reproducing means 201, and then either a data read (R) instruction, or a data write (W) instruction is issued to the noise memory 203 in response to the detection result. That is, when the no signal condition is detected, the data appearing at this time may be recognized as the noise component, so that the data write instruction is issued to the noise memory 203. While the no signal condition is not detected, namely while the reproduced signal is outputted, the data read instruction is issued to read out the data written into the noise memory 203. Then, based on the read noise data, the noise component contained in the reproduced signal is suppressed, or removed by the noise canceling means 202. It should be understood that although the noise data read instruction is issued while the no signal condition is not detected in above description, after the no signal condition was once detected and the noise data has been written into the noise memory 203, the noise component may be suppressed, or removed by utilizing this noise data written into the noise memory also in case of such a no signal condition. By way of the above-explained method, the noise component produced during the signal reproducing operation ca be suppressed, or removed under optimum conditions.

It should also be noted that although the detection of the no signal condition by the no-signal-condition detecting means 206 has been continuously carried out in the above-explained fourth embodiment, the below-mentioned alternative method may be utilized. That is, a noise pattern storage mode for storing the noise pattern during the no signal condition is provided. Only when this noise pattern storage mode is selected, the detection of the no signal condition by the no-signal-condition detecting means 206 may be carried out.

Figure 22:
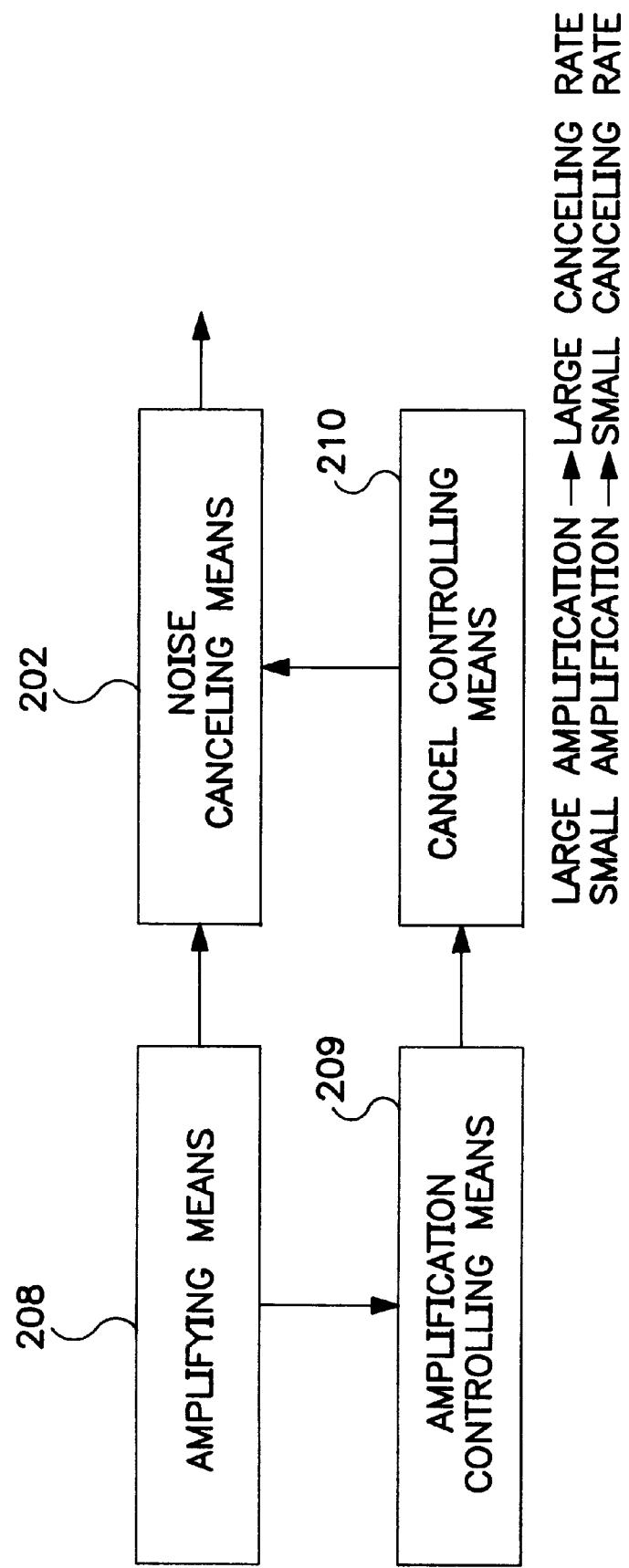
FIG. 22 is a schematic block diagram for showing an arrangement of a noise suppressing apparatus according to a fifth embodiment of the present invention.

FIG. 22 schematically represents an arrangement of a noise suppressing apparatus according to a fifth embodiment of the present inventions In this fifth noise suppressing apparatus, an amplifying means 208 for amplifying a signal used in an FM receiver and an audio deck is employed instead of the above-described recording/reproducing means 201 of the noise suppressing apparatus, and an amplification controlling means 209 is employed so as to control the amplification of-this amplifying means 208. In addition, a cancel controlling means 210 is provided by which the noise canceling ratio is controlled in accordance with the amplification information supplied from the amplification controlling means 209. Then, the noise canceling means 202 suppressed, or removes the noise component contained in the amplified signal based on this controlled noise canceling rate. This cancel controlling means 210 employs, for instance, a noise memory for storing the noise pattern, and may control the noise canceling rate by multiplying this noise pattern by a coefficient, and further may set this coefficient in correspondence with the magnitudes of this amplifications. In other words, when the amplification becomes large, the coefficient is set to a large value, whereas when the amplification becomes small, the coefficient is set to a small value.

Figure 23:
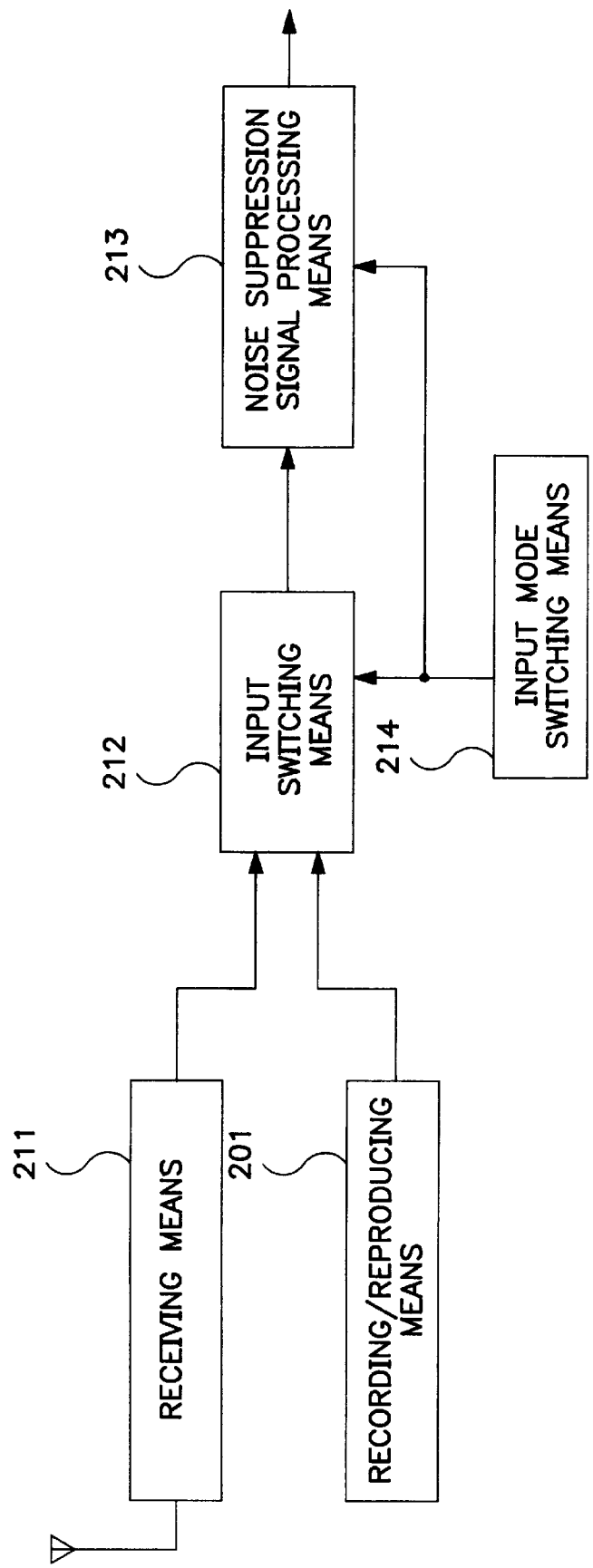
FIG. 23 is a schematic block diagram for showing an arrangement of a noise suppressing apparatus according to a sixth embodiment of the present invention.

FIG. 23 schematically indicates an arrangement of a noise suppressing apparatus according to a sixth embodiment of the present invention. In the sixth noise suppressing apparatus a receiving means 211 for receiving, for example, an FM broadcasting signal is employed other than the recording/reproducing means 201, as previously explained in the first embodiment, and also an input switching means 212 for switching the FM broadcasting signal and the reproduced signal is provided. A noise suppression signal processing means 213 is connected to the output of this input switching means 212, by which the noise suppression is carried out in case of the received signal, whereas the digital sound process is carried out in case of the reproduced signal. Then, the process operations by the input switching means 212 and the noise suppression signal processing means 213 are switched by an input mode switching means 214.

In accordance with the above-described methods the noise suppression is performed when the reception signal having a relatively large amount of noise is received, whereas the signal process is performed during the signal recording/reproducing operations containing a relatively small amount of noise.

Figure 24:
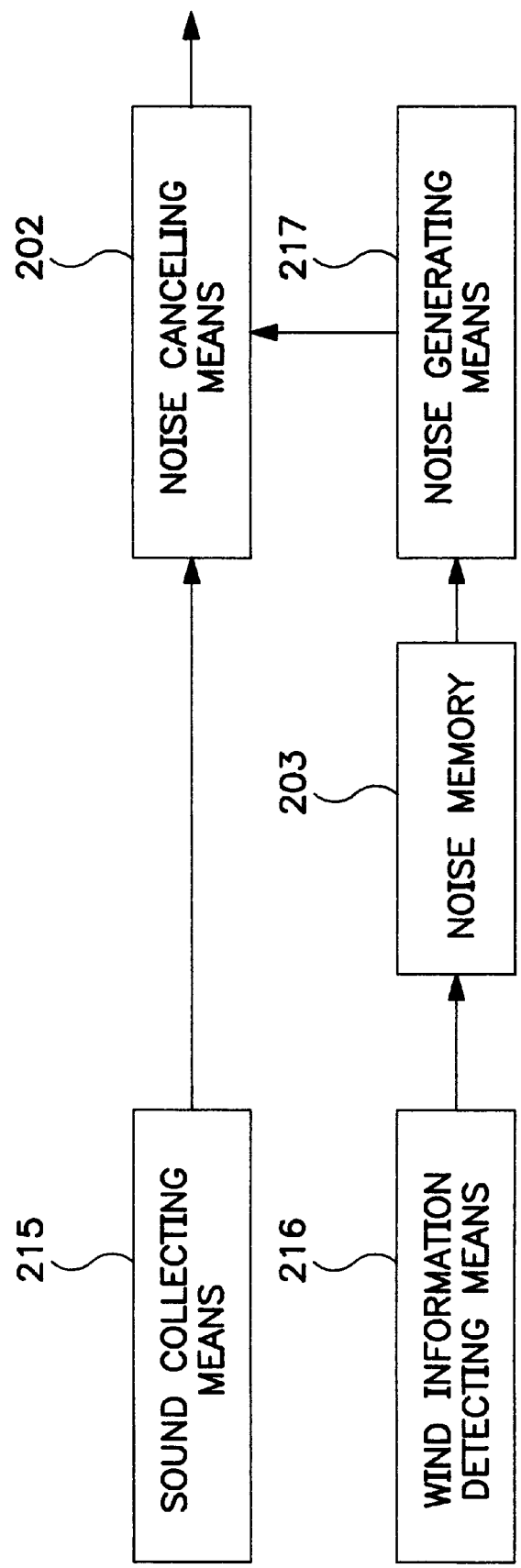
FIG. 24 is a schematic block diagram for showing an arrangement of a noise suppressing apparatus according to a seventh embodiment of the present invention.

FIG. 24 is a schematic block diagram for indicating an arrangement of a noise suppressing apparatus according to a seventh embodiment of the present invention. In the seventh noise suppressing apparatus, there are provided a sound collecting means 215 such as a microphone for collecting-a voice and the like and converting the collected voice into an electric signal, and a wind information detecting means 216 for detecting a physical amount related to wind such as a wind stream, a wind flowing rate, and wind pressure when the sounds are collected. As a consequences a noise component mixed into a signal, which is caused by adverse influences of wind during the sound collection, can be suppressed, or removed. For instance, a Pitot tube may be employed the wind information detecting means 216. It should be noted that for instance, data indicative of a relationship between the wind stream and the noise is previously stored as a memory table in this noise memory 203.

First, when the sounds are collected by the sound collecting means 215, for instance a wind stream is detected by the wind information detecting means 216. Subsequently, the noise data corresponding to this detected wind stream is read out from the noise memory 203 based upon the detected wind stream, and then noise used to suppress, or remove the noise component is generated from the noise generating means 217 in response to the read noise data. Thereafter, the noise canceling means 202 suppresses, or removed the noise component caused by the adverse influence by the wind and contained in the collected/converted electric signal based on the output from the noise generating means 217. In accordance with such a method, the noise produced by the adverse influences by the wind occurred during the sound collection can be suppressed, or removed under optimum conditions.

Figure 25:
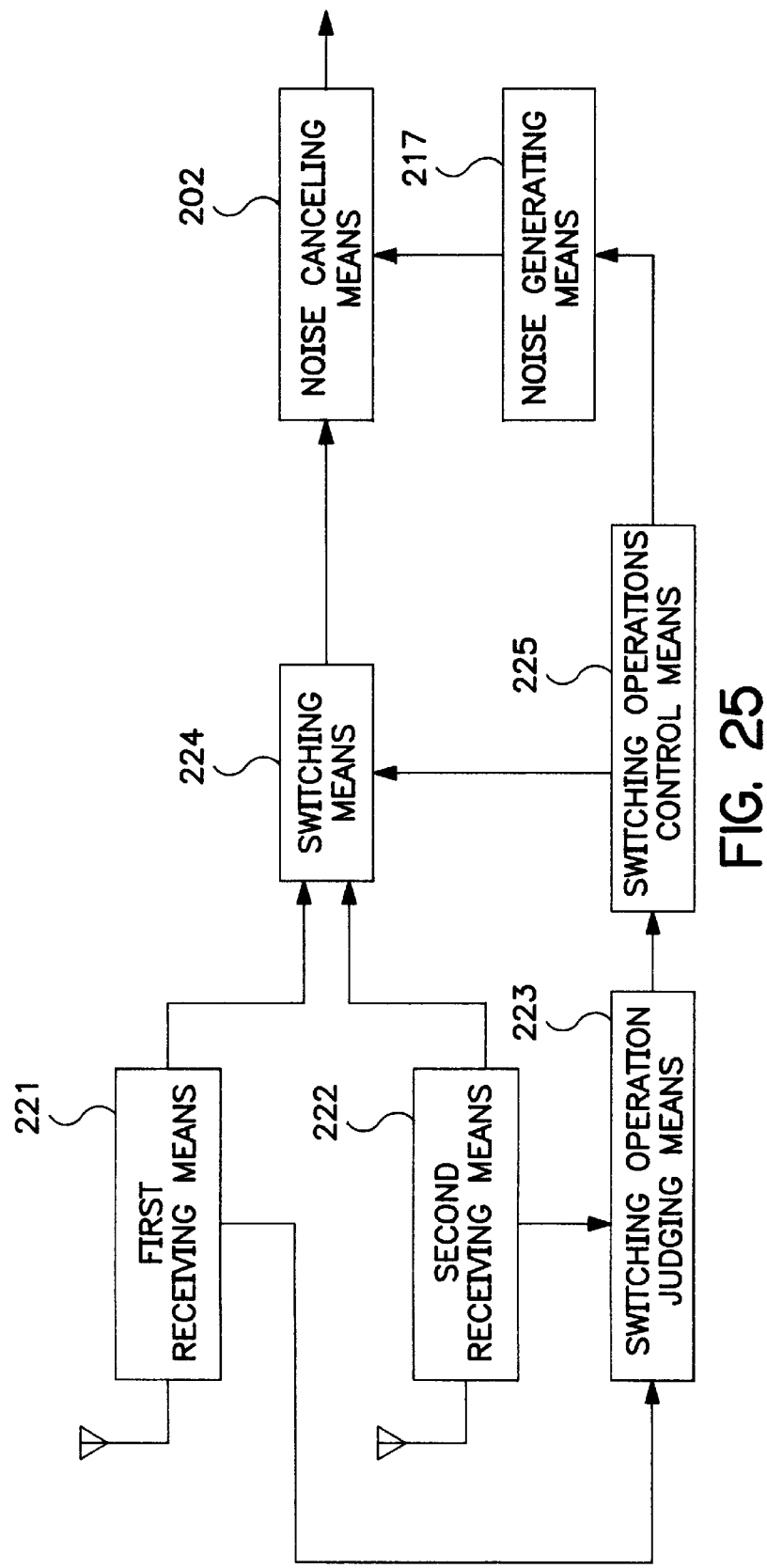
FIG. 25 is a schematic block diagram for showing an arrangement of a noise suppressing apparatus according to a eighth embodiment of the present invention.

FIG. 25 schematically indicates an arrangement of a noise suppressing apparatus according to an eighth embodiment of the present invention. This eighth noise suppressing apparatus may suppress, or remove switching noise occurred when an output signal in an antenna (space) diversity reception system is switched. There are employed a first receiving means 221 and a second receiving means, which receive a signal wave at the same time, and also a switching means 224 for switching the output signals derived from the first and second receiving means 221 and 222. Further, a switching operation judging means 223 is employed so as to judge the switching operation in response to the output signal-from the first receiving means 221 and the output signal from the second receiving means 222, and a switching operation control means 225 is provided in order to control the switching means 224 based upon the judgement result of the switching operation judging means 223. Moreover, a noise generating means 217 is employed to generate such a noise corresponding to the noise occurred during the switching operation based on the switching operation judgement result. Within this noise generating means 217, for instance, a noise memory is provided into which noise patterns corresponding to the noise produced, depending upon the switching conditions, are previously stored.

In accordance with the above-described method, the noise components produced when the reception signals are switched can be suppressed or removed. In particular, the great effects may be expected in the noise suppression or removing-operation if the switching judgement is fluctuated near the threshold values.

Figure 26:
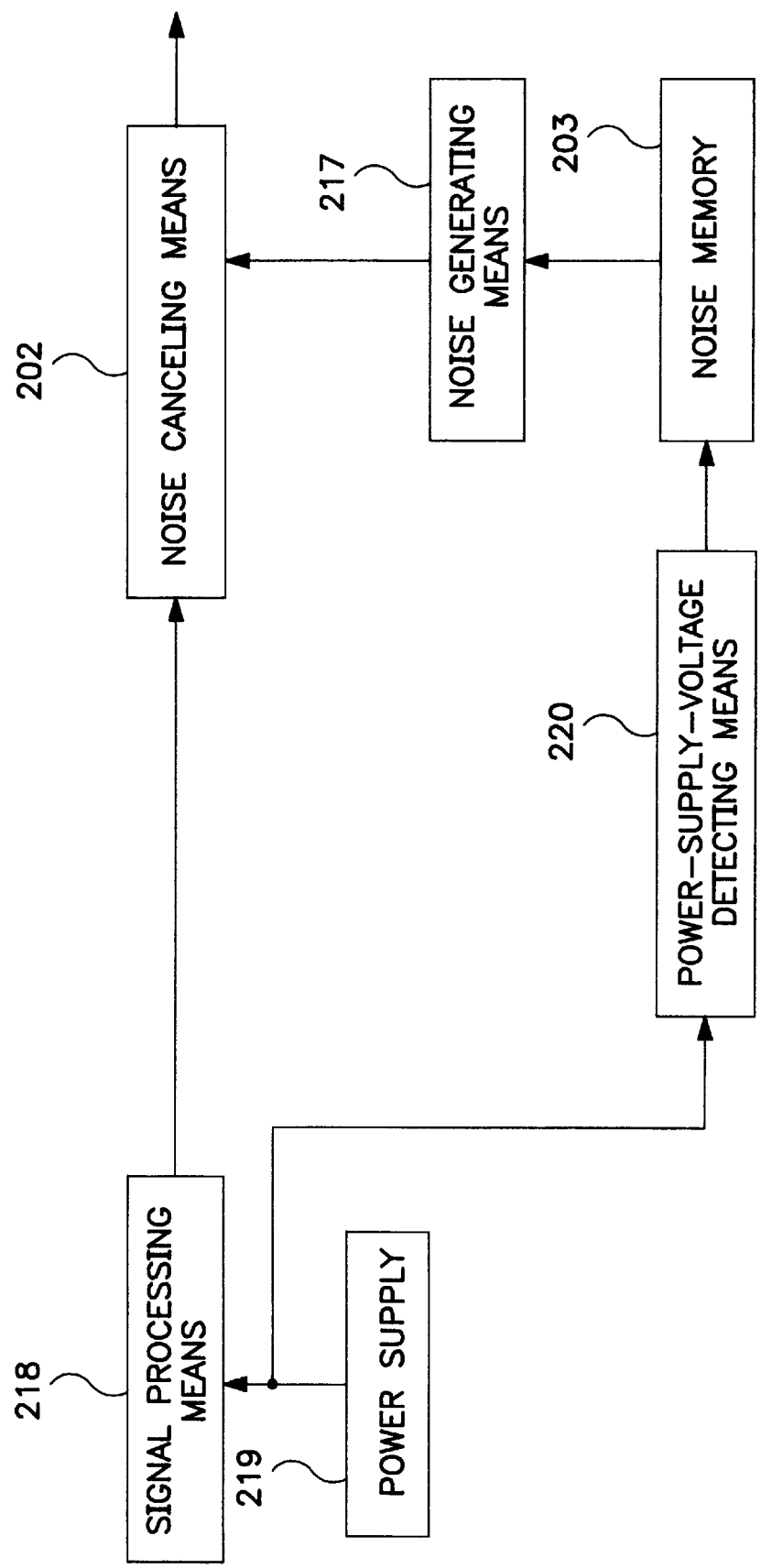
FIG. 26 is a schematic block diagram for showing an arrangement of a noise suppressing apparatus according to a ninth embodiment of the present invention.

In FIG. 26, there is shown an arrangement of a noise suppressing apparatus according to a ninth embodiment of the present invention. In the eighth noise suppressing apparatus, a signal processing means 218 for processing a signal derived from a receiver, an amplifier, an oscillator, a modulator, a detector, a demodulator, and so on is provided, and this signal processing means 218 is powered by a power supply 219 such as a battery. Also, a power-supply-voltage detecting means 220 is provided to detect the supply voltage of the power supply 219, and a noise memory 203 for storing noise patterns produced by the supply voltages of the power supply 219 and the influences thereof.

Generally speaking, when the supply voltage is lowered, the signal processing circuit such as a receiver, an amplifier, and an oscillator may readily produce noise. Therefore, in accordance with the eighth noise suppressing apparatus, lowering of the supply voltage is detected by the power-supply-voltage detecting means 220, the noise pattern stored in the noise memory 203 is read out in response to the detection result, and then noise used to cancel the above-explained noise caused by the influence by the power supply voltage is generated from the noise generating means 217. Base upon this noise generated from the noise generating means 217, the noise canceling means 202 suppress, or removes the noise component contained in the signal outputted from the signal processing means 218.

As previously described the noise which is caused due to lowering of the power supply voltage may be suppressed, or removed under optimum conditions.

Although the above description has been made of such a noise suppression, or elimination when the noise is produced due to the influences caused by lowering of the supply voltage, this ninth embodiment is not limited thereto but may be applied to other cases, that for instance, when the supply voltage is increased, the above-described noise suppression is performed.

Figure 27:
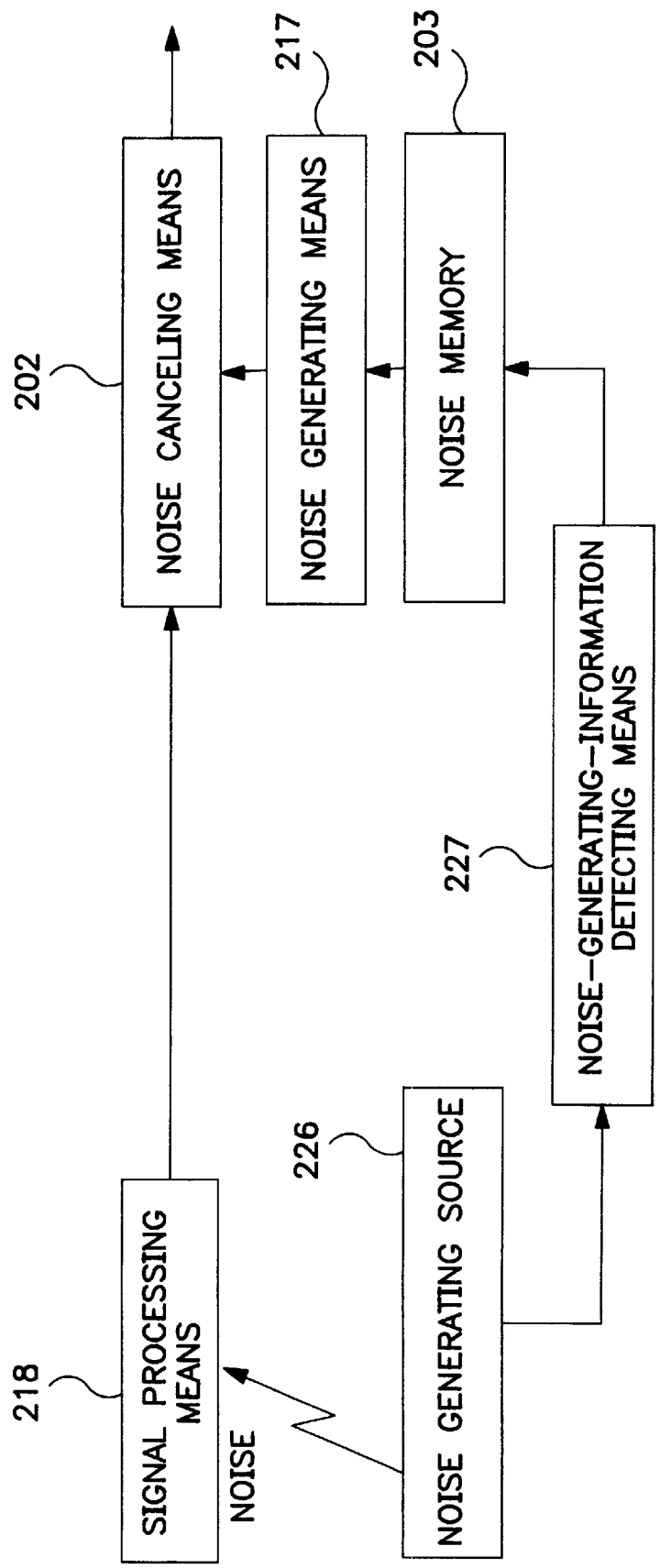
FIG. 27 is a schematic block diagram for showing an arrangement of a noise suppressing apparatus according to a tenth embodiment of the present invention.

FIG. 27 is a schematic block diagram for showing an arrangement of a noise suppressing apparatus according to a tenth embodiment of the present invention. This tenth noise suppressing apparatus may suppress, or eliminate noise mixed into a signal derived from a signal processing means 218, which is caused by interference signal waves produced from a noise generating source 226 of an automobile which builds in this signal processing means 218. As this noise generating source 226, there are an engine of an automobile, a motor, and a vibration machine. A noise-generating-information detecting means 227 is provided in the tenth noise suppressing apparatus, by which the rotational frequency, or the vibration frequency of the noise generating source 226 is detected. The noise patterns corresponding to the noise produced in accordance with the rotational frequency, or the vibration frequency of the noise generating source 226, have been previously stored in the noise memory 203.

Assuming now that, for instance, the engine of the automobile is under revolution, the noise pattern suitable for the detection result (revolution number of engine) derived from the noise-generating-information detecting means 227 is read out from the noise memory 203. Based on the read noise pattern, the noise generating means 217 generates such a noise used to suppress, or remove the noise component. Then, the noise canceling means 202 will suppress, or remove the noise components caused by the interference signal waves contained in the signals outputted from the signal processing means 218 based on the generated noise.

In accordance with the above-described method, the noise components mixed into the signals due to the adverse influences by the noise generating source 226 can be suppressed, or removed under optimum conditions.

It should be noted that although the rotational frequency, or the vibration frequency has been utilized as the physical amount related to the noise generation in the above-explained tenth embodiment, this tenth embodiment is not limited thereto, but may be applied to, for instance, when a reciprocating drive unit is employed, a reciprocative period may be employed as this physical amount.

Figure 28:
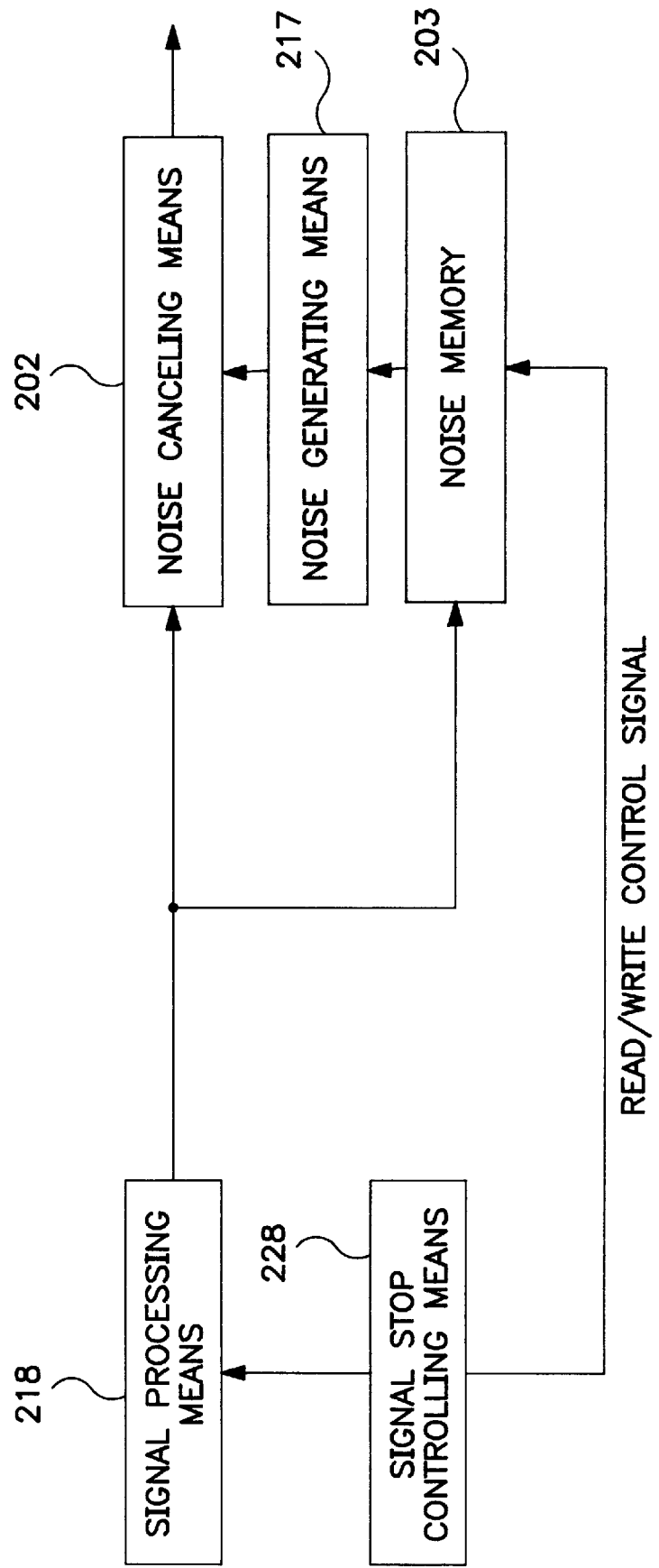
FIG. 28 is a schematic block diagram for showing an arrangement of a noise suppressing apparatus according to a eleventh embodiment of the present invention.

FIG. 28 schematically indicates an arrangement of a noise suppressing apparatus according to an eleventh embodiment of the present invention. In this eleventh noise suppressing apparatus, a signal stop controlling apparatus 228 is provided so as to control stopping of only a signal processed by the signal processing means 218. This signal stop controlling means 228 may be arranged in such a manner that, for instance, a signal stop mode is selectable.

First, upon selection of this signal stop mode, the signal stop controlling means 228 issues such an instruction that only the signal processing operation of the signal processing means 218 is stopped, and at the same time, the signal component (namely, noise component since normal signal) outputted from the signal processing means 218 is written into the noise memory 203. Next, when this signal stop mode is released, the signal processing operation by the signal processing means 218 is restarted under control of the signal stop controlling means 228, so that the signal is outputted from the signal processing means 218. At the same time, a read instruction is given to the noise memory 203. As a results the noise is generated from the noise generating means 217 in response to the noise data stored in the noise memory 203, and then the noise canceling means 202 suppresses, or remove the noise component contained in the signal based on the noise generated from the noise generating means 217.

As previously explained, in accordance with the eleventh noise suppressing method similar to the fourth noise suppressing method, such a noise contained in the signal can be suppressed, or removed under optimum conditions by storing the noise obtained when no signal is present and by utilizing this stored noise.

It should also be noted that although the above-explained eleventh noise suppressing apparatus has been arranged to select the signal stop mode, the eleventh embodiment is not limited thereto, but may be arranged in such a manner that, for example, the signal stop controlling means 228 may be automatically operated for a predetermined time period at the beginning of the audio tape reproducing operation.

Figure 29:
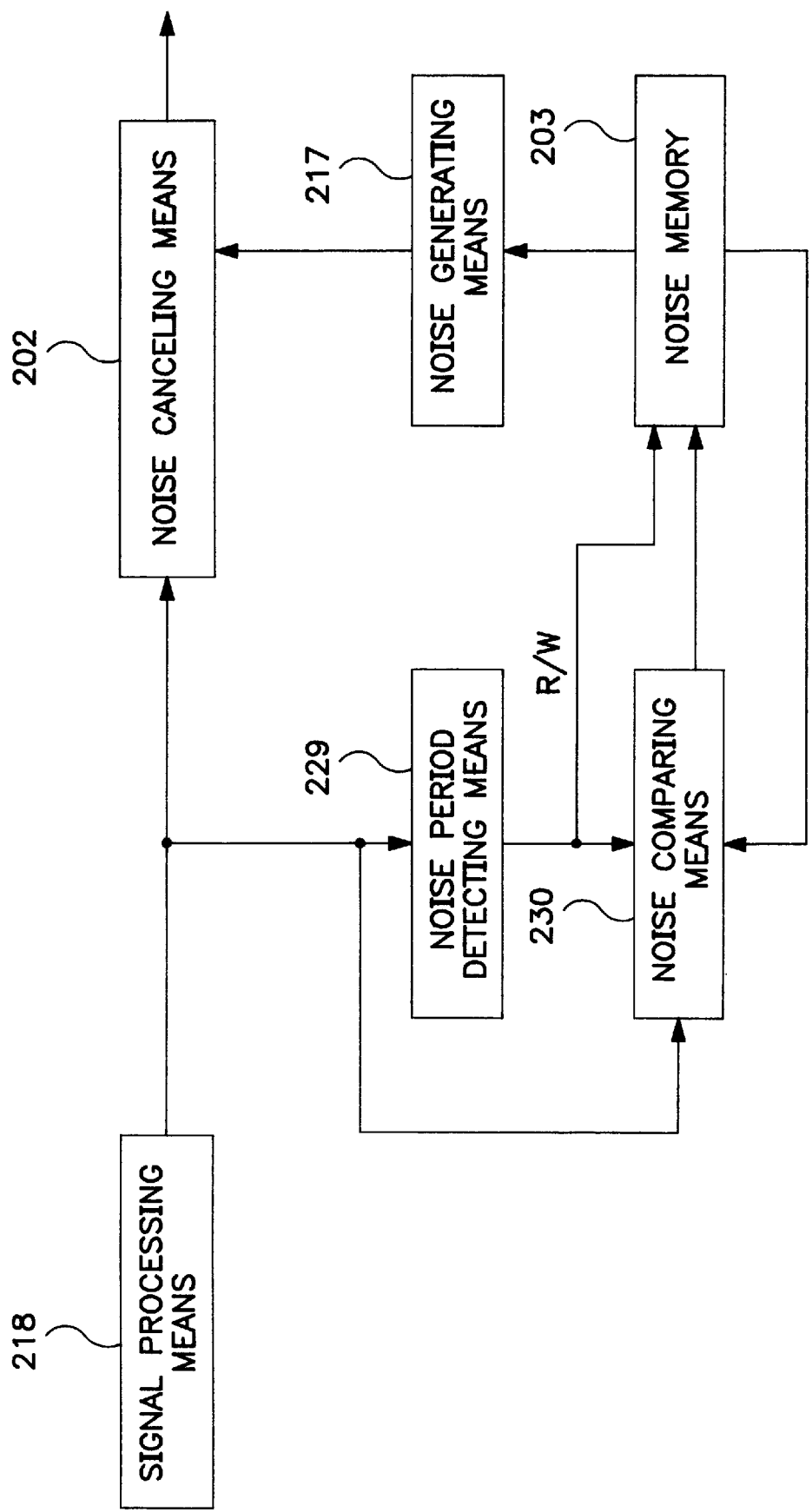
FIG. 29 is a schematic block diagram for showing an arrangement of a noise suppressing apparatus according to a twelfth embodiment of the present invention.

FIG. 29 schematically represents an arrangement of a noise suppressing apparatus according to a twelfth embodiment of the present invention. In the twelfth noise suppressing apparatus, there is employed a noise period detecting means 229 having a similar function to that of the above-explained no-signal-condition detecting means 206 employed in the fourth embodiment shown in FIG. 21. Furthermore, a noise comparing means 230 is provided. When the noise period (namely, no signal period) is detected by the noise period detecting means 229, the noise data obtained when this noise period is detected, is compared with the noise data stored in the noise memory 203 by this noise comparing means 230.

A different operation of this twelfth noise suppressing apparatus from that of the fourth noise suppressing apparatus is as follows: The past noise data stored in the noise memory 203 is compared with the present noise data. As a comparison result, for instance, when a comparison difference becomes greater than a certain time, the past noise data stored in the noise memory 203 is updated by the present noise data. The subsequent basic operation of this twelfth noise suppressing apparatus is similar to that of the previous noise suppressing apparatus. That is, the noise component contained in the signal may be suppressed, or removed based upon the noise data stored in the noise memory 203. It should be understood that although the suppression, or elimination of such a noise component is carried out while the noise period is not detected alternatively the noise suppression, or elimination may be executed even when the noise period is detected if a difference between the past noise data and the present noise data is small.

As explained above, since the noise data used to suppress or remove the noise component is updated every time the comparison results are changed, the noise component can be suppressed, or removed under optimum condition even when the noise component is varied in connection with the variations in the processed signals.

Figure 30:
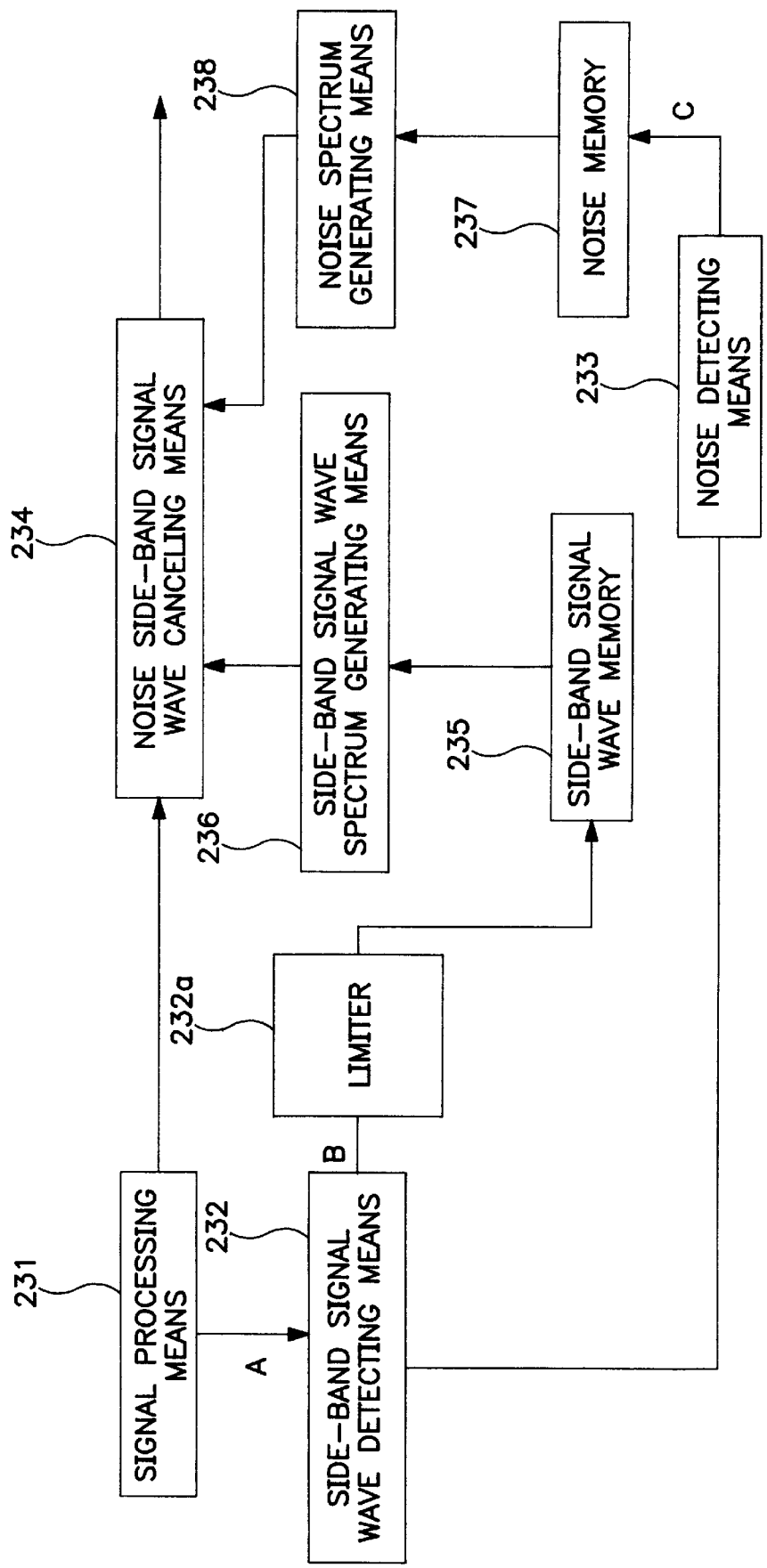
FIG. 30 is a schematic block diagram for showing an arrangement of a noise suppressing apparatus according to a thirteenth embodiment of the present invention.

FIG. 30 schematically indicates an arrangement of a noise suppressing apparatus according to a thirteenth embodiment of the present invention. The thirteenth noise suppressing apparatus is arranged by a signal processing means 231 for processing a signal containing a side-band signal wave; a side-band signal wave detecting means 232 for detecting the side-band signal wave contained in this signal; and a limiter 232a for removing noise contained in the signal detected by the side-band signal wave detecting means 232. This thirteenth noise apparatus further includes a side-band signal wave memory 235 for storing data about the side-band signal wave which has passed through the limiter 232a; a side-band signal wave spectrum generating means 236 for outputting a side-band signal wave spectrum in response to the side-band signal wave data stored in the side-band signal wave memory 235; a noise detecting means 233 for detecting noise outputted from the side-band signal wave detecting means 232; and a noise memory 237 for storing noise data detected by the noise detecting means 233. Moreover, this noise suppressing apparatus is constructed of a noise spectrum generating means for outputting noise spectrum based upon the noise data stored in the noise memory 237; and a noise side-band signal wave canceling means 234 for suppressing, or removing both the side-band signal wave and the noise component, which are contained in the signal processed by the signal processing means 231. This noise side-band signal wave canceling means 234 may suppress, or remove both the side-band signal wave and the noise component, which are contained in the signal, based on the side-band signal wave spectrum outputted from the side-band signal wave spectrum generating means 236, and also the noise spectrum outputted from the noise spectrum generating means 238. As a results only a high C/N carrier signal is outputted from the side-band signal wave canceling means 234.

Figure 31A:
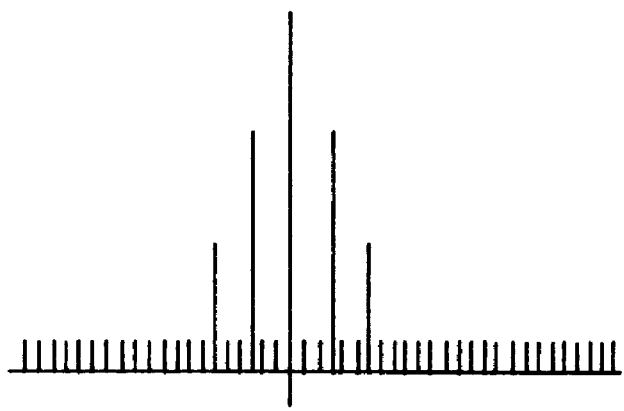
FIGS. 31A, 31B and 31C schematically shows a signal condition in the noise suppressing apparatus according to the thirteenth embodiment.
Figure 31B:
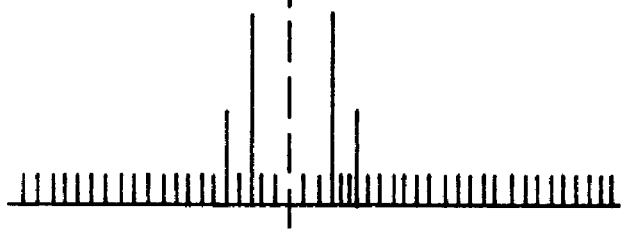
Figure 31C:
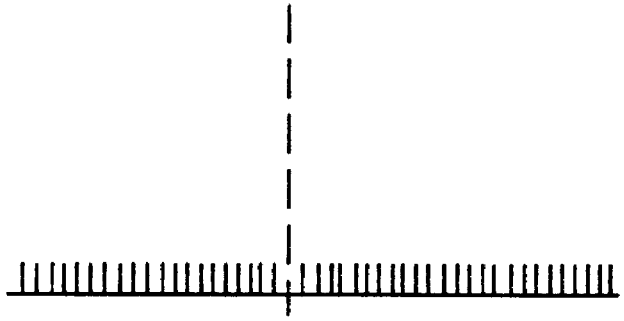

As represented in FIG. 31A, a spectrum of a signal (FIG. 30A) processed by the signal processing means 231 is such that the side-band signal waves are present on both sides of the carrier signal, and the noise components are contained in the entire signal band. A spectrum of a signal (FIG. 30B) outputted from the side-band signal wave detecting means 232 is such that, as represented in FIG. 31B, the carrier signal has been removed from the signal components shown in FIG. 31A, and accordingly only the side-band signal wave and the noise component are left. A spectrum of a signal (FIG. 30C) outputted from the noise detecting means 233 is such that, as indicated in FIG. 31C, the side-band signal wave has been furthermore removed from the signal component shown in FIG. 31B, and thus, only the noise component remains.

As described above, in accordance with the thirteenth noise suppressing apparatus, both the side-band signal wave and the noise are once extracted from the signal, and these side-band signal wave and noise are removed from the original signal, so that the high C/N carrier signal can be derived.

Although the spectrum subtraction method has been employed in the noise canceling means 202 in the above-described embodiment, only other methods may be alternatively utilized, such as an adaptive filter, a bandpass filter, and a muting method.

As apparent from the foregoing descriptions, the noise suppressing apparatus according to the present invention owns the following various advantages. That is, the high frequency characteristic of the signal from which the noise component contained in this signal has been removed, involves substantially no deterioration. The articulation of the noise-suppressed signal can be improved. Moreover, the noise produced during the noise suppression can be reduced.

What is claimed is:

1. An audio noise suppressor for a TV receiver comprising:
    video ghost detecting means for detecting a ghost in a video signal of signals received by said TV receiver,
    predictive noise controller means for receiving an output from the ghost detecting means;
    noise generator means for receiving an output from the predictive noise controller means and generating noise based on said detected ghost in the video signal;
    means for receiving only an audio signal from the TV receiver; and
    audio noise canceling means for suppressing or removing only audio noise components contained in the audio signal of the signals received by the TV receiver based on the noise generated by the noise generator means.

2. A noise suppressing apparatus comprising:
    receiving means for receiving a signal wave;
    recording/reproducing means for recording/reproducing a signal;
    signal switching means for switching between a first output signal derived from said receiving means and a second output signal derived from said recording/reproducing means;
    noise suppressing signal processing means for performing: (1) a first operation of suppressing, or removing a noise component contained in the first output signal, and (2) a second operation of performing a signal control process operation on the second output signal; and
    input mode switching means for causing (1) the signal switching means to switch between the first output signal and the second output signal, and (2) the noise suppressing signal processing means to perform the first operation or the second operation.

3. A noise suppressing apparatus comprising:
    signal processing means for processing a signal, the signal processing means having noise;
    signal stop controlling means for stopping only the signal processed by the signal processing means;
    a noise memory, said noise memory including means coupled to the signal processing means for storing in the noise memory only the noise data when the signal is stopped by the signal stop controlling means;
    noise generating means for receiving said noise data stored in the noise memory and for generating noise responsive to the noise data; and
    noise canceling means for suppressing, or removing a noise component contained in the signal processed by the signal processing means based on the noise generated by the noise generating means when the signal is not stopped by the signal stop controlling means, wherein said noise suppressing apparatus is free of feedback.

4. A noise suppressing apparatus comprising:

signal processing means for processing a signal containing a sideband signal component;

sideband signal detecting means for detecting the sideband signal component from the signal processed by the signal processing means;

a sideband signal memory for storing the detected sideband signal component;

sideband signal wave spectrum generating means for producing a sideband signal wave spectrum data in response to the sideband signal wave data stored in the sideband signal memory;

noise detecting means for detecting noise from the signal;

a noise memory for storing the detected noise;

a noise spectrum generating means for producing noise spectrum data in response to the detected noise stored in the noise memory; and noise sideband signal canceling means for suppressing, or removing both the sideband component and the noise component contained in the signal processed by the signal processing means based on the sideband signal wave spectrum data and the noise spectrum data.

5. The noise suppressing apparatus according to claim 4, wherein the noise sideband signal canceling means includes spectrum subtracting means for performing spectrum subtraction to suppress, or remove both the sideband component and the noise component contained in the signal processed by the signal processing means.

\* \* \* \* \*

UNITED STATES PATENT AND TRADE MARK OFFICE
CERTIFICATE OF CORRECTION

PATENT NO.   : 5,982,901
DATED        : November 9, 1999
INVENTOR(S)  : Kane et al.

It is certified that error appears in the above-identified patent and that said Letters Patent is hereby corrected as shown below:

Cover page, item [57] Abstract, line 11, "signals" should be --signal--.

Signed and Sealed this

Nineteenth Day of December, 2000

Attest:

Q. TODD DICKINSON

*Attesting Officer*        *Commissioner of Patents and Trademarks*